US012455838B2

(12) United States Patent
Venkatesh et al.

(10) Patent No.: US 12,455,838 B2
(45) Date of Patent: Oct. 28, 2025

(54) SYSTEM AND METHOD FOR DETERMINING PERIPHERAL DEVICE CONFIGURATIONS ACROSS A PLURALITY OF WORKSPACES FOR SEAMLESS USER PERIPHERAL DEVICE WORKSPACE ECOSYSTEM EXPERIENCE

(71) Applicant: Dell Products, LP, Round Rock, TX (US)

(72) Inventors: Ramanujam K. Venkatesh, Bangalore (IN); Vivek Viswanathan Iyer, Saint Johns, FL (US); Michael S. Gatson, Austin, TX (US); Anantha K. Boyapalle, Cedar Park, TX (US); Nathaniel Overholtzer, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 103 days.

(21) Appl. No.: 18/430,712

(22) Filed: Feb. 2, 2024

(65) Prior Publication Data
US 2025/0252063 A1    Aug. 7, 2025

(51) Int. Cl.
*G06F 13/10* (2006.01)
(52) U.S. Cl.
CPC ........ *G06F 13/102* (2013.01); *G06F 2213/40* (2013.01)
(58) Field of Classification Search
CPC ........................... G06F 13/102; G06F 2213/40
USPC .......................................................... 710/5
See application file for complete search history.

(56) References Cited

U.S. PATENT DOCUMENTS

| 9,003,311 B2 | 4/2015 | Reeves |
| 10,057,131 B1 | 8/2018 | Brown |
| 10,606,725 B2 | 3/2020 | Hanson |
| 11,244,561 B1 * | 2/2022 | Fuchs ................ H04N 21/4222 |
| 11,321,247 B2 | 5/2022 | Bshara |
| 2019/0179645 A1 | 6/2019 | Prasad |
| 2020/0015300 A1 | 1/2020 | Suumaki |
| 2021/0307085 A1 * | 9/2021 | Pavlou .................... G06F 21/85 |

* cited by examiner

*Primary Examiner* — Christopher B Shin
(74) *Attorney, Agent, or Firm* — Prol Intellectual Property Law, PLLC; H. Kenneth Prol

(57) ABSTRACT

A peripheral device workspace cloud orchestrator information handling system comprises a network interface device to receive functional capabilities for an existing peripheral device previously operatively coupled by a user to a user information handling system anchor node for a peripheral device workspace defined by a manifest of included peripheral device nodes, location, and peripheral device workspace identification value, and a user composite peripheral device workspace identifier associated with an adjustable operational configuration instructing the existing peripheral device operation, a hardware processor to execute code instructions to identify new peripheral device capabilities within a received new device orchestrated device descriptor for a new peripheral device operatively coupled to the anchor node, determine a minimum percentage of the new peripheral device capabilities matches the existing functional capabilities, and instruct the anchor node to configure the new peripheral device according to the adjustable operational configuration associated with the existing peripheral device.

20 Claims, 5 Drawing Sheets

SYSTEM AND METHOD FOR DETERMINING PERIPHERAL DEVICE CONFIGURATIONS ACROSS A PLURALITY OF WORKSPACES FOR SEAMLESS USER PERIPHERAL DEVICE WORKSPACE ECOSYSTEM EXPERIENCE

FIELD OF THE DISCLOSURE

The present disclosure generally relates to automatic assessment or configuration of peripheral devices for use in a user peripheral device workspace. The present disclosure more specifically relates to assessment or automated setup and updating of configurations for peripheral devices, either internal or external to an information handling system, based on functionality and configurations for other peripherals in use by the user, such as the capabilities for an existing or newly added peripheral device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output devices such as a keyboard, mouse, touchpad, gaming controller, display device, wearable peripheral device, speakers, earbud, headphone, microphone, stylus, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
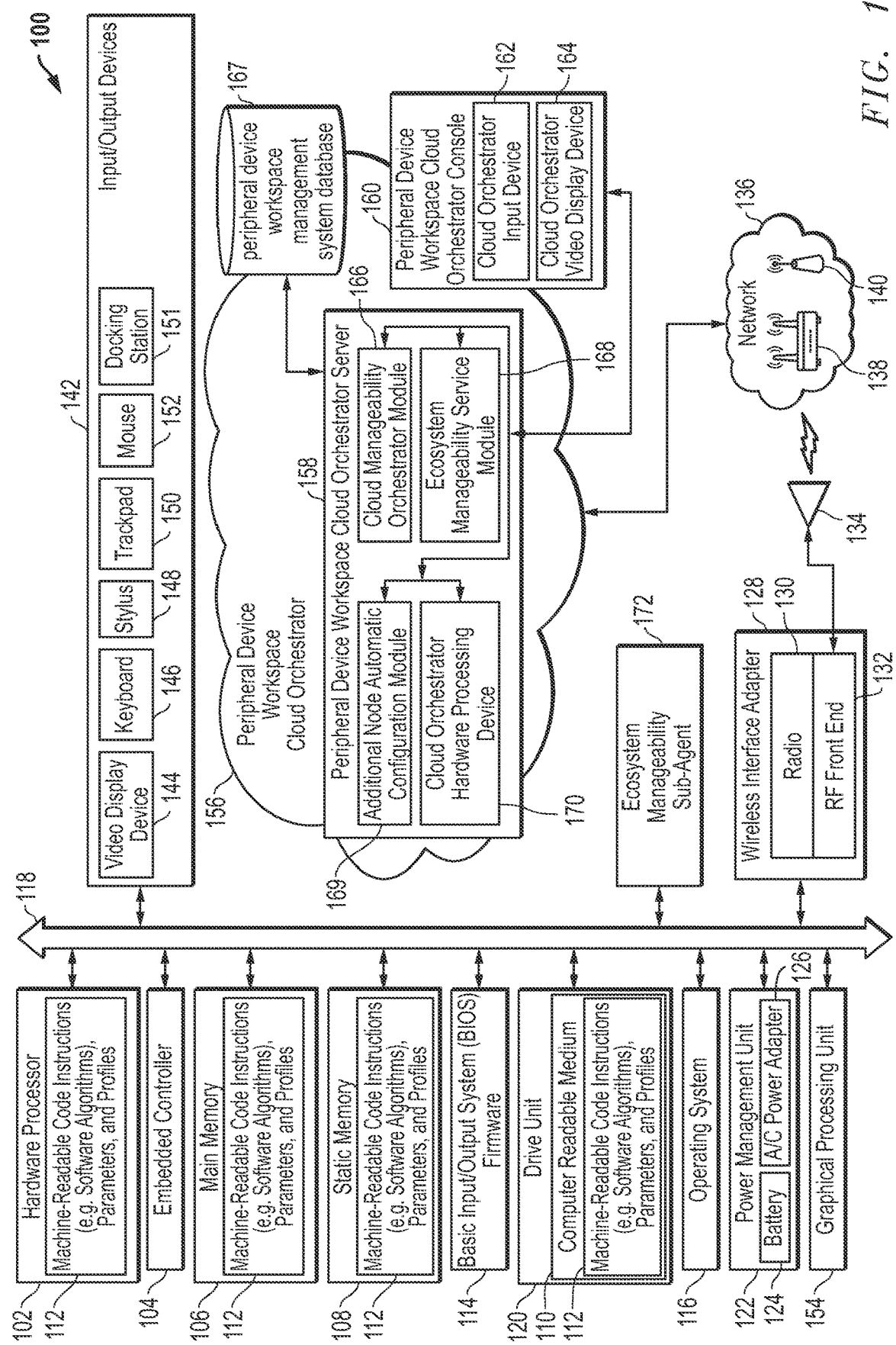
FIG. 1 is a block diagram illustrating a cloud-based information handling system executing code instructions of a peripheral device workspace cloud orchestrator to orchestrate configuration of peripheral devices across a plurality of user peripheral device workspaces according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A user may oftentimes use an information handling system in a peripheral device workspace. In this context, a peripheral device workspace can be viewed as an environment that includes a user information handling system (e.g., a laptop) operating as an anchor node for the peripheral device workspace and peripheral devices operating as secondary nodes of the peripheral device workspace that are connected to the user information handling system. An environmental context may include, for example, location, time of day, applications being executed, wireless or wired connection capabilities, or security credentials for the user. Peripheral devices may commonly include internal or external devices such as displays, a keyboard, a mouse, a webcam, a printer, a speaker, a fingerprint scanner, etc. In various embodiments, a peripheral device workspace may include a wired or wireless dock by which the user information handling system connects to some or all the peripheral devices including smart peripheral devices having some compute or input/output capabilities.

A peripheral device workspace, in various embodiments, be used for hybrid work scenarios. For example, a business may have an office space that includes hoteling cubes that can be assigned to, reserved by, or otherwise utilized by the business's employees as peripheral device workspaces. In such cases, the business may allow its employees to connect their laptops to a dock in a particular hoteling cube where various peripherals may be available for use. In other embodiments, a business may have collaborative peripheral device workspace such as for a conference room or a meeting room. Users may also employ peripheral device workspaces when working from home or other locations.

When a user employs multiple peripheral device workspaces (e.g., by connecting a laptop to different combinations of peripheral devices during a workday), it can be tedious for the user to configure the peripheral device workspaces to his or her preferences. For example, while using one peripheral device workspace, the user may set configurations for the peripheral devices of the peripheral device workspace to match the user's preferences. If the user switches to a different peripheral device workspace, those configurations may not be consistent with the peripheral devices of the different peripheral device workspace or may result in unintended changes. The user may therefore have to manually reconfigure the peripheral devices within the peripheral device workspace.

As one particular example, a user may have a home peripheral device workspace that includes a 4K monitor peripheral device with 3840×2160 resolution at 60 Hz that is in landscape orientation and that also includes a 32-inch Full High Definition (FHD) monitor with 1920×1080 resolution that is in portrait orientation. This user may have set adjustable operational configurations for this home peripheral device workspace to personalize these display devices. The user may also have access to multiple office peripheral device workspaces (e.g., in a hoteling scenario), and these peripheral device workspaces may have different sets of peripheral devices such as a first office peripheral device workspace with two display devices and a second office peripheral device workspace with a single display device or a conference room. If the user's adjustable operational configurations for the home peripheral device workspace are applied to the office peripheral device workspaces, the display device(s) will likely not be configured in accordance with the user's preferences. The user will then need to manually reconfigure the office peripheral device workspace to achieve her preferences. When the user returns to her home peripheral device workspace, she may again be required to manually reconfigure the home peripheral device workspace. As can be seen, when using multiple peripheral device workspaces, personalized adjustable operational configurations for peripheral devices are likely to be lost or misapplied due to the mismatching set of peripheral devices that make up the peripheral device workspaces. These issues arise in cases where the user switches between entirely different peripheral device workspaces (e.g., when leaving home where a home peripheral device workspace is used to travel to work where an office peripheral device workspace is used) as well as in cases where the user creates a different peripheral device workspace through the connection and/or disconnection of a peripheral device (e.g., when connecting an external webcam to a dock or laptop that is part of an existing peripheral device workspace).

Execution of code instructions for an ecosystem manageability sub-agent on a user information handling system monitor for context of a peripheral device workspace, such as time, location, applications currently executing or planned, connection type (e.g., wireless, wired, wireless wide area network (WWAN), wireless local area network (WLAN), wireless private area network (WPAN)), security credentials for the user, or environmental sensor readings (e.g., humidity, temperature), among other possible telemetry readings for the information handling system. These telemetry measurements may be gathered routinely, or upon each startup of an information handling system, for example. Further, the ecosystem manageability sub-agent executing at the information handling system may create a manifest of peripheral devices at a location to represent the current peripheral device workspace, including an identification of the user, an identification (e.g., by Media Access Control (MAC) address) of each of the peripheral devices connected to or operably coupled to the information handling system, one or more context features (e.g., time, location, applications executing, etc.), and one or more adjustable operational configurations (e.g., resolution for an external display device) for the operably coupled peripheral devices. Peripheral device workspaces may be associated with a peripheral device workspace identification value and include a location identifier and a manifest of peripheral devices or other nodes, such as anchor node information handling system or systems or smart nodes which is stored in a peripheral device workspace cloud orchestrator server database, peripheral device workspace management system database, or similar cloud based database in embodiments herein. Such a manifest may be written in a machine-readable language or machine markup language such as JavaScript Object Notation (JSON), for example, and transmitted for storage at the peripheral device workspace management system database associated with a peripheral device workspace cloud orchestrator operating in a cloud computing platform. The peripheral device workspace identification value for a peripheral device workspace may also have associated with it additional information such as the telemetry information described above or contextual data about the operational capabilities and settings of nodes, including peripheral device nodes, smart peripheral device nodes, and anchor information handling system nodes in particular peripheral device workspaces. Each time a peripheral device adjustable operational configuration is changed by the user, a new peripheral device is added to the peripheral device workspace, or a new context is detected, an updated or new manifest including this updated adjustable operational configuration, context information, or new peripheral device registration may be transmitted to a peripheral device workspace cloud orchestrator executing at a cloud platform.

Various peripheral device workspaces such as the hybrid work office peripheral device workspaces, collaborative peripheral device workspaces, and other peripheral device workspaces described herein may be defined by location indicator detected for an anchor node information handling system operating at the peripheral device workspace, and a manifest of nodes of peripheral devices and smart devices that may operate in the peripheral device workspace. As described, each such defined peripheral device workspace may also be assigned a peripheral device workspace identification value which may be stored and associated with stored manifests of nodes operating in the peripheral device workspace at the peripheral device management system database, peripheral device workspace cloud orchestrator server database, or similar remote database. Additional environmental context data for the peripheral device workspace may be stored within one or more peripheral device workspace anchor node status update documents as well as included in the definition of the peripheral device workspace and associated with its peripheral device workspace identification value defined at the peripheral device workspace cloud orchestrator server database, including peripheral device capabilities, peripheral device connectivity details, current peripheral device configurations or settings, peripheral device setting or configuration options, current status of the peripheral devices within the peripheral device workspace, and other features of nodes within the peripheral device workspace. For example, the definition of the peripheral device workspace associated with a specific peripheral device workspace identification value may include a set of environmental context data and stored within one or more peripheral device workspace anchor node status update documents, such as time, applications currently executing or planned, connection type, hardware component capabilities or usage metrics, or environmental sensor readings (e.g., humidity, temperature), among other possible environmental context telemetry readings for an anchor node information handling system operating within the defined peripheral device workspace.

A peripheral device workspace may be defined by a location identifier (e.g., location in a wireless or wired network, global positioning, or other with association with a physical location), a list of peripheral devices operatively coupled to an anchor node information handling system for a user, type of peripheral device workspace (e.g., personal, hoteling office/shared, or collaborative), and additionally in some cases, by one or more of the environmental context data for the peripheral device workspace described herein. Each of these defining factors may be associated in memory for the peripheral device workspace management system with the peripheral device workspace identification value, which may also be associated with one or more peripheral device operational configuration policies describing how the peripheral device nodes within the defined peripheral device workspace are to operate. Thus, a particular peripheral device operational configuration policy for one or more peripheral devices within a given peripheral device workspace having a peripheral device workspace identification value may apply only when certain environmental context telemetries, such as telemetries describing usage patterns for those peripheral devices are detected. In such a way, the peripheral device operational configuration policy for a peripheral device within a peripheral device workspace may be defined or associated with particularly defined usage patterns for that peripheral device. For example, a peripheral device operational configuration policy may apply only when certain software applications are executing at the anchor node information handling system defined within the peripheral device workspace, or when one or more hardware components' (e.g., graphics processing unit (GPU), central processing unit (CPU), memory) usage metrics or connectivity metrics meet a predefined threshold.

A database memory for the peripheral device workspace management system may further store a user composite peripheral device workspace identifier that is unique to individual users of one or more defined peripheral device workspaces that are associated with identification of the user of the user's information handling system and peripheral device workspace identification values of the peripheral device workspaces used by that user. Thus, a user composite peripheral device workspace identifier may identify a single user of an anchor node information handling system, and a peripheral device workspace identification value for each of one or more peripheral device workspaces in which the user's information handling system operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric.

A user may wish to automatically configure newly purchased peripheral devices in the same way that similar peripheral devices (e.g., those being replaced by the new or updated peripheral device) were configured, and for various peripheral device workspaces and contexts already associated with that user. Each peripheral device available for purchase at a product purchase platform may have an associated orchestrated device descriptor (ODD) which includes a description of all non-configurable aspects of the peripheral device available for purchase, as well as the configurable capabilities of such a device, a unique peripheral device identifier such as a serial number, and a peripheral device type classification (e.g., mouse, display, keyboard, webcam, etc.). Upon shipment of the newly purchased peripheral device to the user and initial pairing of that device with the user's information handling system, execution of code instructions of the peripheral device workspace cloud orchestrator may retrieve the orchestrated device descriptor (ODD) for the newly purchased device from the product purchase platform. The peripheral device workspace cloud orchestrator may compare the configurable capabilities of the newly purchased device, as described within the retrieved orchestrated device descriptor, to those of all peripheral devices associated with the user as defined within the user composite peripheral device workspace identifier for the purchasing user. If a match is found, the peripheral device workspace cloud orchestrator may instruct the anchor node for the peripheral device workspace to apply the peripheral device configuration for the matching existing peripheral device to the newly purchased peripheral device, based on the user's current peripheral device workspace and context.

Execution of code instructions of the peripheral device workspace cloud orchestrator may compare the functional capabilities for the newly purchased peripheral device, as determined based on the orchestrated device descriptor for the newly purchased device to functional capabilities for all other peripheral devices associated with the user within the user composite peripheral device workspace identifier. If the functional capabilities for the newly purchased peripheral device do not differ by a threshold amount (e.g., by more than 20%) from the functional capabilities for an existing peripheral device previously associated with the user composite peripheral device workspace identifier, the peripheral device workspace cloud orchestrator may determine that a match has been made. This may occur, for example, if the newly purchased peripheral device is a replacement for a previously used peripheral device of the same or similar make and model as the newly purchased peripheral device. In other cases, the functional capabilities for the newly purchased peripheral device may differ by more than a threshold amount (e.g., by more than 20%) from those of all existing peripheral devices currently associated with the user composite peripheral device workspace identifier. This may be the case if the newly purchased peripheral device is a significant upgrade (e.g., from wired to wireless) from the previously used peripheral devices associated with the user composite peripheral device workspace identifier, or if the newly purchased peripheral device is a different type of device (e.g., a touchpad) than the previously used peripheral device (e.g., mouse) associated with the user composite peripheral device workspace identifier. In such a scenario, execution of code instructions of the peripheral device workspace cloud orchestrator may create a default peripheral device operational configuration policy using information from the newly purchased peripheral device ODD for automatic configuration of the newly purchased peripheral device.

In an embodiment in which the peripheral device workspace cloud orchestrator executes code instructions to determine that functional capabilities for the newly purchased peripheral device match those of an existing peripheral device associated with the user composite peripheral device workspace identifier for a particular user or subscriber, the peripheral device workspace cloud orchestrator may execute code instructions to retrieve a stored peripheral device operational configuration policy for the matching existing peripheral device. The peripheral device workspace cloud orchestrator may then execute code instructions to transmit that existing peripheral device operational configuration policy to the ecosystem manageability sub-agent operating at the user's information handling system. The ecosystem manageability sub-agent operating at the user's information handling system may then institute that received peripheral device operational configuration to configure the adjustable operational capabilities for the newly purchased peripheral device to match those of the matching existing peripheral device within the same peripheral device workspace.

As the user continues to use this newly purchased peripheral device in various peripheral device workspaces and contexts, new peripheral device workspace anchor node status update documents may be generated that include configuration settings for the newly purchased peripheral device. The peripheral device workspace cloud orchestrator may continue to gather such information and adjust peripheral device operational configuration policies associated with this newly purchased peripheral device according to changes in peripheral device workspace and context, as was performed with previously operatively coupled peripheral devices. In such a way, the peripheral device workspace cloud orchestrator may automatically update peripheral device configurations as the user peripheral device workspace and context change and as new peripheral devices are added to the user's various peripheral device workspaces.

FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be one of a plurality of device nodes as part of a peripheral device workspace described in embodiments herein or an information handling system 100 may serve as a peripheral device workspace cloud orchestrator server 158 that is operatively coupled to a peripheral device workspace cloud orchestrator console 160 in the peripheral device workspace cloud orchestrator 156 described herein. In an embodiment, the cloud orchestrator console 160 may also be an information handling system 100 itself that is used by an internet technology decision maker (ITDM) to create peripheral device operational configuration policies with one or more peripheral device workspace cloud orchestrator servers 158 to be propagated down to node devices within a peripheral device workspace such as the information handling system 100, a docking station 151, video display device 144, keyboard 146, stylus 148, trackpad 150, mouse 152, and the like. In this embodiment, the information handling system 100, may receive the peripheral device operational configuration policies generated by the ITDM at the peripheral device workspace cloud orchestrator console 160, or generated by the peripheral device workspace cloud manageability orchestrator module 166 based on default peripheral device configuration settings via execution of code instructions of the cloud manageability orchestrator module 166 and the ecosystem manageability service module 168 at the peripheral device workspace cloud orchestrator server 158 as described in embodiments herein.

Thus, in a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other hardware processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a docking station 151, a keyboard 146, a mouse 152, video display device 144, stylus 148, or trackpad 150 among other peripheral devices any combination of which may form one or more various peripheral device workspaces according to embodiments herein.

The information handling system 100 further includes a video/graphics display device 144. The video/graphics display device 144 in an embodiment may function as a liquid crystal display (LCD), an organic light emitting diode (OLED), a flat panel display, or a solid-state display. It is appreciated that the video/graphics display device 144 may be wired or wireless and may be an external video/graphics display device 144 that allows a user to increase the desktop area by extending the desktop in an embodiment. Additionally, as described herein, the information handling system 100 may include or be operatively coupled to one or more other I/O devices 142 including the wired or wireless mouse 152 described herein that allows the user to interface with the information handling system 100 via the video/graphics display device 144, a cursor control device (e.g., a trackpad 150, or gesture or touch screen input), a stylus 148, and/or a keyboard 146, among others. Information handling system 100 may also be operatively coupled to a peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may each be a node device associated with the information handling system 100 and may be part of a peripheral device workspace defined and identified with a peripheral device workspace identification value via execution of the ecosystem manageability service module 168 and cloud manageability orchestrator module 166, as described in embodiments herein. Various drivers and hardware control device electronics may be operatively coupled to operate the I/O devices 142 according to the embodiments described herein. The present specification contemplates that the I/O devices 142 may be wired or wireless.

A network interface device of the information handling system 100 shown as wireless interface adapter 128 can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources as described herein that allow for the creation and maintenance of peripheral device workspaces (e.g., as shown below in FIGS. 2 and 3) and orchestration of different node devices within one or more peripheral device workspaces. In embodiments described herein, the wireless interface device 128 with its radio 130, RF front end 132 and antenna 134 is used to communicate with the wireless peripheral devices via, for example, a Bluetooth® or Bluetooth® Low Energy (BLE) protocols. In an embodiment, the WAN, WWAN, LAN, and WLAN may each include an AP 138 or base station 140 used to operatively couple the information handling system 100 to a network 136. In a specific embodiment, the network 136 may include macrocellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device or wireless interface adapter 128. It is appreciated that any computing device including the cloud orchestrator server 158, the cloud orchestrator console 160, and the information handling system 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a peripheral device workspace cloud orchestrator 156 that includes any number of servers, computing devices, and other cloud computing resources such as the peripheral device workspace cloud orchestrator server 158. The peripheral device cloud orchestrator 156 may, therefore, include any hardware that may be distributed over multiple physical locations but act in concert with each other and specifically the peripheral device workspace cloud orchestrator server 158 to facilitate maintenance and implementation of peripheral device operational configuration policies for a plurality of peripheral device workspaces, wherein the one or more node devices (e.g., including the information handling system 100 as an anchor node device, and one or more peripheral device nodes such as I/O devices 142) form part of each peripheral device workspace, create or adjust peripheral device operational configuration policies based on the registered node devices detected within the one or more created peripheral device workspaces, and apply the peripheral device operational configuration policies to the created peripheral device workspace(s). It is appreciated that the node devices described herein may include each of the peripheral devices operatively coupled to the information handling system 100 acting as a primary or anchor node device and the workspaces created may be described as a peripheral device workspace.

The peripheral device workspace cloud orchestrator server 158 may be any computing device that may include similar elements as the information handling system 100 such as a memory device, a cloud orchestrator hardware processing device 170, a PMU, and other elements that allow the peripheral device workspace cloud orchestrator server 158 to execute code instructions of the cloud manageability orchestrator module 166, ecosystem manageability service module 168, additional node automatic configuration module 169, and other software as described herein. In an embodiment, the peripheral device workspace cloud orchestrator server 158 may be operatively coupled to a peripheral device workspace cloud orchestrator console 160. The peripheral device workspace cloud orchestrator console 160 may be used by the ITDM in some embodiments to create and propagate peripheral device operational configuration policies, or to manage dynamic peripheral device workspace sessions (e.g., associate a user's identification with a peripheral device workspace with a user composite peripheral device workspace identifier). It is appreciated that the peripheral device workspace cloud orchestrator console 160 may include a cloud orchestrator input device 162 and a cloud orchestrator video display device 164 that allows the ITDM to complete these processes and engage with the peripheral device workspace cloud orchestrator server 158 in an embodiment.

As described herein, the peripheral device workspace cloud orchestrator server 158 includes a computer-readable program code of a peripheral device workspace cloud manageability orchestrator module 166 that, when executed by the cloud orchestrator hardware processing device 170 of the peripheral device workspace cloud orchestrator server 158, manages creation and adjustment of peripheral device operational configuration policies for one or more node devices. In the context of embodiments of the present specification and in the appended claims, a peripheral device workspace may be an ecosystem of node devices (e.g., including peripheral devices coupled to the information handling system 100, a docking station 151, etc.) connected to a primary or anchor node device such as the information handling system 100. In an embodiment, a peripheral device workspace may also be defined with a peripheral device workspace identification value and be part of a user composite peripheral device workspace identifier for a user and associated with each of the information handling system 100 and peripheral devices (e.g., input/output devices 142) such that a user may have multiple peripheral device workspaces having peripheral device workspace identification values that are associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location of the peripheral device workspace (e.g., defined by location data such as GPS data, network data, or other data to link to a physical location) and having a having a peripheral device workspace identification value.

In an embodiment, the execution of computer-readable program code of the peripheral device workspace cloud manageability orchestrator module 166 causes the peripheral device workspace cloud orchestrator server 158 to receive, create, or adjust peripheral device operational configuration policies based on the registered node devices detected within the one or more created peripheral device workspaces having peripheral device workspace identification values. In some embodiments, the peripheral device operational configuration policies may be received from the peripheral device workspace cloud orchestrator console 160 as initiated by the ITDM. The ITDM may be any information technology decision maker that may decide the peripheral device operational configuration policies to be associated with peripheral device workspaces formed at the peripheral device workspace cloud orchestrator server 158 and having peripheral device workspace identification values. For example, the ITDM may decide which settings for each of the node devices, including the primary or anchor node device, is an optimal and desired setting to be used. In such an example embodiment, the ITDM may create these peripheral device operational configuration policies and desired settings at the peripheral device workspace cloud orchestrator console 160 for capabilities of particular peripheral devices. In other example embodiments, these settings may be set by the peripheral device workspace cloud manageability orchestrator module 166 to a default configuration determined based on identified capabilities of a given peripheral device, as described herein. In various embodiments herein, the peripheral device workspace cloud orchestrator console 160 may propagate these peripheral device operational configuration policies to the peripheral device workspace cloud orchestrator server 158 executing the peripheral device workspace cloud manageability orchestrator module 166. Upon receipt of these peripheral device operational configuration policies created at the peripheral device workspace cloud orchestrator console 160 by the ITDM or by the peripheral device workspace cloud manageability orchestrator module 166, the execution of the peripheral device workspace cloud manageability orchestrator module 166 may propagate these peripheral device operational configuration policies to each of the device nodes within the created peripheral device workspace.

An ITDM for an enterprise, or the user of the information handling system 100 in an embodiment may also use the console 160 to define a minimum percentage of features or capabilities between two comparable peripheral devices or a minimum percentage of peripheral device unique identifiers that must match in order to recommend that two comparable peripheral devices be configured in the same way, as described in greater detail below with respect to FIGS. 3 and 5. For example, a user or an ITDM may use the peripheral device workspace cloud orchestrator console 160 to require that 80 percent of functional capabilities for two separate peripheral devices be identical to one another in order to recommend that both devices be configured according to the same peripheral device workspace operational configuration policy that defines one or more adjustable operational configurations for the two comparable devices. This is only an example of one threshold value, and other minimum requirements for identity of functional capabilities between two different peripheral devices in embodiments may include any value from one to one hundred (e.g., 50%, 75%, 90%, etc.). As another example, an ITDM for an enterprise may use the peripheral device workspace cloud orchestrator console 160 to require that 50 percent of peripheral devices for two separate peripheral device workspaces (e.g., including 101) be identical to one another in order to recommend that both devices be configured according to the same peripheral device workspace operational configuration policy that defines one or more adjustable operational configurations for the two comparable peripheral devices. This is only an example of one threshold value, and other minimum requirements for identity of peripheral devices between two different peripheral device workspaces in embodiments may include any value from one to one hundred (e.g., 20%, 30%, 60%, etc.). A scoring system may be determined by execution of code instructions on the peripheral device workspace cloud orchestrator system from the ODD of peripheral devices to determine number of overlapping capabilities for peripheral devices as well as available configuration setting levels in context data for those capabilities including operational configurations (e.g., sampling speeds, resolution levels, processing or memory (if any), or others) and connectivity configurations (e.g., wireless protocols, wired protocols, connector ports, etc.). The ODD for existing peripheral devices or the new peripheral devices further includes a description of all non-configurable aspects of the peripheral device, as well as the configurable capabilities of such a device, a unique peripheral device identifier such as a serial number, and a peripheral device type classification (e.g., mouse, display, keyboard, webcam, etc.). Much of this ODD data and data determined from the peripheral device workspace identification values for particular peripheral device workspaces may come from environmental context data collected via telemetry from a peripheral device workspace.

In an embodiment, the peripheral device workspace cloud orchestrator server 158 may also execute computer readable program code of an ecosystem manageability service module 168. Execution of the ecosystem manageability service module 168 applies the peripheral device operational configuration policies to the created peripheral device workspace. In an embodiment, the peripheral device workspace cloud manageability orchestrator module 166 creates or adjusts peripheral device operational configuration policies for each of the one or more node devices within the peripheral device workspace. As described herein, the ecosystem manageability service module 168 may identify those peripheral devices 142 that form part of the peripheral device workspace having a peripheral device workspace identifier value and may propagate those peripheral device operational configuration policies that apply to those peripheral devices. For example, where a plurality of peripheral device workspaces with a plurality of peripheral device workspace identifier values each include a specific wireless mouse for which a peripheral device operational configuration policy has been created or updated, the execution of the computer-readable program code of the ecosystem manageability service module 168 causes the peripheral device workspace cloud orchestrator server 158 to send those peripheral device operational configuration policies to the appropriate peripheral device workspace (e.g., to each of the primary or anchor node devices 100) so that those peripheral device operational configuration policies may be passed to the wireless mice in each peripheral device workspace having a peripheral device workspace identifier value where such as specific mouse model or type is located.

A node device database operatively coupled to the peripheral device workspace cloud orchestrator server 158 may provide the peripheral device workspace cloud orchestrator server 158 with details regarding the node devices detected and forming the peripheral device workspaces and associated particular peripheral device workspace identification values described herein. For example, the node device database may include data regarding the possible settings for any given node device, compatibility of these node devices with other node devices within any given peripheral device workspace, and capabilities of the node devices among other characteristics and features of the node devices.

An information handling system 100 that is operatively connected to one or more peripheral devices 142 in an embodiment may operate as an anchor node for the peripheral device workspace in that it gathers capabilities and peripheral device operational and environmental context telemetry readings about all of the peripheral devices 142, within a given peripheral device workspace, as described directly below, communicates that peripheral device operational and environmental context telemetry readings to the cloud manageability orchestrator module 166, receives peripheral device operational configuration policies describing how to configure the peripheral devices 142, and the anchor node information handling system 100 itself, and implements peripheral device operational configuration policies. As new nodes are added to the peripheral device workspace, the cloud-based additional node automatic configuration module 169 may determine the best or most appropriate peripheral device operational configuration policies for a given peripheral device workspace, based on previously defined peripheral device operational configuration policies set by an ITDM or by a user for various other peripheral devices 142 previously established within existing peripheral device workspaces, and a comparison of capabilities for the newly added node and other peripheral devices 142 previously added to the peripheral device workspace. Such a determination may further depend upon the peripheral device operational and environmental context telemetry readings, which may include, for example, time of day, applications being executed, wireless or wired connection capabilities, or security credentials for the user. In such a way, execution of code instructions of the additional node automatic configuration module may automatically update peripheral device configurations for newly added nodes within a peripheral device workspaces to match current peripheral device operational and environmental context telemetry readings.

Execution of code instructions for an ecosystem manageability sub-agent 172 on a user information handling system 100 monitors for sets of environmental context data of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible peripheral device operational and environmental context telemetry readings for the information handling system node 100 and peripheral device nodes 142 in a peripheral device workspace. These peripheral device operational and environmental context telemetry readings associated with a peripheral device workspace identification value may be gathered routinely in telemetry measurements, or upon each startup of an anchor information handling system 100, for example. The ecosystem manageability sub-agent 172 executing at the information handling system 100 in a peripheral device workspace 101 may create a manifest of peripheral device nodes 142 and other nodes for a peripheral device workspace identification value to represent the current peripheral device workspace, including an identification of a location, identification of the user, and an identification (e.g., by product serial number or other peripheral device identification) of each of the peripheral device nodes 142 connected to or operably coupled to the anchor information handling system 100 at a peripheral device workspace. Identification of the each of the peripheral device nodes 142 may include or be associated with an ODD in various embodiments herein.

The hardware processor 102 of the user anchor information handling system 100 may execute code instructions of the ecosystem manageability sub-agent 172 to also collect one or more peripheral device operational and environmental context telemetry readings (e.g., time, applications executing, hardware component usage metrics, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational and environmental context telemetry readings for the peripheral device workspace and an identification of the anchor node information handling system 100 user into a peripheral device workspace anchor node status update document written in a machine-readable language or machine markup language such as JavaScript Object Notation (JSON), for example, and to be associated with a peripheral device workspace identification value. The peripheral device workspace anchor node status update document may be transmitted for storage with the peripheral device workspace identification value at a peripheral device workspace management system database 167 operating in the peripheral device workspace cloud orchestrator 156. Each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator 156.

The peripheral device workspace management system database 167 may further store a user composite peripheral device workspace identifier that is unique to individual users of one or more defined peripheral device workspaces that are associated with identification of the user of the user's information handling system 100 and peripheral device workspace identification values of the peripheral device workspaces used by that user. Thus, a user composite peripheral device workspace identifier may identify a single user of an anchor node information handling system 100, and a peripheral device workspace identification value for each of one or more peripheral device workspaces in which the user's information handling system 100 operates as an anchor node at various times. The user composite peripheral device workspace identifier may thus be user-specific and user-centric. The peripheral device workspace identification value, in comparison, may define a location and list of peripheral device nodes 142, and may thus be peripheral device workspace-centric.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
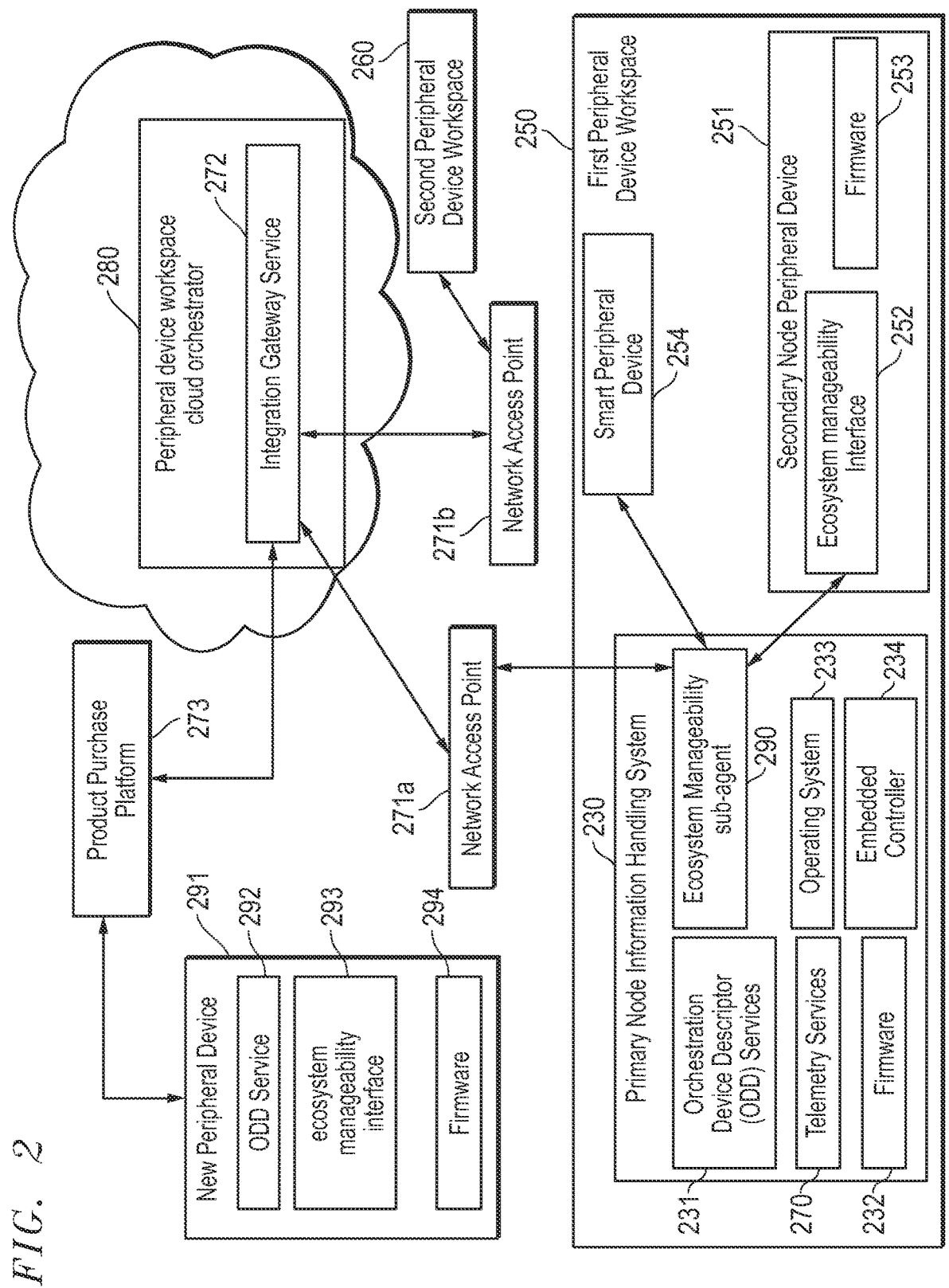
FIG. 2 is a block diagram illustrating a cloud-based peripheral device workspace cloud orchestrator for defining a first peripheral device workspace including a user information handling system and peripheral devices according to an embodiment of the present disclosure.

FIG. 2 is a block diagram illustrating a cloud-based peripheral device workspace cloud orchestrator for defining a first of a plurality of peripheral device workspaces in which a user information handling system operatively couples with a first plurality of peripheral devices according to an embodiment of the present disclosure. As described previously, a user may oftentimes use an information handling system 230 in a peripheral device workspace 250. In this context, a peripheral device workspace 250 or 260 can be viewed as an environment with a location identifier that includes the user information handling system 230 (e.g., a laptop) operating as a primary or anchor node for the peripheral device workspace 250 and peripheral devices 251 and 254 operating as secondary nodes of the peripheral device workspace 250 that are connected to the user information handling system 230. An environmental context may include, for example, location, time of day, applications being executed, wireless or wired connection capabilities, or security credentials for the user. Peripheral devices 251 and 254 may commonly include internal or external devices such as displays, a keyboard, a mouse, a webcam, a printer, a speaker, a fingerprint scanner, etc. According to various embodiments herein, a peripheral device workspace 250 or 260 may include a wired or wireless dock by which the user information handling system 230 connects to some or all the peripheral devices including smart peripheral devices such as 254 having some compute or input/output capabilities. Peripheral device 254 in an example embodiment may considered a "smart" peripheral device because it may operate an agent or firmware, and include a network interface device or wireless receiver that makes the smart peripheral device 254 capable of direct communication with the cloud-based peripheral device workspace cloud orchestrator 280 via the integration gateway services 272 and the network access point 271 for some subset of secondary nodes. Similarly, a primary or anchor node information handling system 230 is also capable of direct communication with the cloud-based peripheral device workspace cloud orchestrator 280 via the integration gateway services 272 and the network access point 271 for some or all secondary nodes in the peripheral device workspace 250 or 260.

A peripheral device workspace 250 or 260 may oftentimes be used for hybrid work scenarios. For example, a business may have an office space that includes hoteling cubes that can be assigned to, reserved by, or otherwise utilized by the business's employees as peripheral device workspaces 250 or 260. In such cases, the business may allow its employees to connect their laptops (e.g., 230) to a dock (e.g., 254) in a particular hoteling cube where various peripherals (e.g., 251) may be available for use. A business may also have a collaborative peripheral device workspace 250 or 260 that may be a conference room or meeting room where plural users with plural primary node information handling systems 230 utilize some or all peripheral device nodes in that peripheral device workspace at the same time. Users may also employ peripheral device workspaces 250 or 260 when working from home or other locations.

When a user employs multiple peripheral device workspaces 250 or 260 (e.g., by connecting a laptop to different combinations of peripheral devices during a workday), it can be tedious for the user to configure the peripheral device workspaces 250 or 260 to his or her preferences. For example, while using one peripheral device workspace 250, the user may set configurations for the peripheral devices 251 and 254 of the peripheral device workspace 250 to match the user's preferences or they may be configured to meet an operating policy set by an ITDM for a given peripheral device workspace. If the user switches to a different peripheral device workspace 260, those configurations may not be consistent with the peripheral devices (not shown) of the different peripheral device workspace 260 or may result in unintended changes. The user may therefore have to manually reconfigure the peripheral devices (not shown) within the peripheral device workspace 260.

As one particular example, a user may have a home peripheral device workspace 250 that includes a 4K monitor peripheral device 251 with 3840×2160 resolution at 60 Hz that is in landscape orientation and that also includes a 32-inch Full High Definition (FHD) monitor with 1920× 1080 resolution that is in portrait orientation. This user may have set adjustable operational configurations for this home peripheral device workspace 250 to personalize these display devices. The user may also have access to multiple office peripheral device workspaces such as 260 (e.g., in a hoteling scenario), and these peripheral device workspaces such as 260 may have different sets of peripheral devices such as a first office peripheral device workspace with two display devices and a second office peripheral device workspace with a single display device or a conference room. If the user's adjustable operational configurations for the home peripheral device workspace 250 are applied to the office peripheral device workspaces such as 260, the display device(s) will likely not be configured in accordance with the user's preferences. The user will then need to manually reconfigure the office peripheral device workspace 260 to achieve her preferences. When the user returns to her home peripheral device workspace 250, she may again be required to manually reconfigure the home peripheral device workspace 250. As can be seen, when using multiple peripheral device workspaces 250 and 260, personalized adjustable operational configurations for peripheral devices such as 251 are likely to be lost or misapplied due to the mismatching set of peripheral devices that make up the peripheral device workspaces 250 and 260. These issues arise in cases where the user switches between entirely different peripheral device workspaces 250 and 260 (e.g., when leaving home where a home peripheral device workspace is used to travel to work where an office peripheral device workspace is used) as well as in cases where the user creates a different peripheral device workspace 250 or 260 through the connection and/or disconnection of a peripheral device such as 251 or 254 (e.g., when connecting an external webcam to a dock or laptop that is part of an existing peripheral device workspace).

Execution of code instructions for an ecosystem manageability sub-agent 290 on a user information handling system 230 monitor telemetry readings taken by a telemetry service 270 for environmental context data of a peripheral device workspace, such as time, location, applications currently executing or planned, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible telemetry readings for the information handling system 230. These telemetry measurements may be gathered routinely, or upon each startup of an information handling system 230, for example.

In addition, the peripheral device workspace cloud orchestrator 280 may gather information regarding the range of capabilities for each peripheral device (e.g., 251 and 254). Each peripheral device, such as 251 may include a range of capabilities, and the user may choose to configure the peripheral device 251 to operate according to a selected setting or configuration within this range of capabilities. For example, in an embodiment in which the peripheral device 251 is an external display device, the peripheral device 251 may be capable of operating within a range of functional capabilities defining the display resolution, such as between a resolution of 640×480 pixels, which may be the lowest resolution supported by the operating system 233, and 3840×2160 pixels, which is the standard resolution for 4K Ultra-High Definition (4K UHD) monitors. Thus, the functional capabilities for the peripheral device 251 in such an example may be the entire range between 640×480 pixels and 3840×2160 pixels. The user may select an adjustable operational configuration for the peripheral device 251 by choosing one available resolution within this range of 620×480 pixels and 3840×2160 pixels. This may be done by the user, for example, through a "preferences," "properties," or "settings" user interface within the operating system 233. Because the user may choose one of several available configurations within the range of functional capabilities, the chosen configuration may be referred to herein as an adjustable operational configuration that may be selected by the user. In some cases, the peripheral device 251 may be preset with a default configuration. These default configurations may also be considered adjustable operational configurations herein, in that the user has the opportunity to adjust such a default configuration through the "preferences," "properties," or "settings" user interface within the operating system 233. In such a way, the peripheral device 251 may be configured according to a user-selectable, adjustable operational configuration that lies within a range of functional capabilities for the peripheral device. Other capabilities may include connectivity capabilities for a peripheral device 251, such as types of wired connectors or wireless protocols available configuration may include selection of connectivity type as well as speeds or bandwidths available.

In the case where the peripheral device 251 has already been purchased and set up by the user within one of the peripheral devices workspaces, such as 250, the information defining the range of functional capabilities for the peripheral device 251 may be stored at the peripheral device 251, within the firmware 253. In another embodiment, in which a new peripheral device 291 is purchased by the user from the product purchase platform 273, which is in communication with and accessible or manageable by the peripheral device workspace cloud orchestrator 280, the range of functional capabilities for the peripheral device 291 may be stored at an orchestration device descriptor (ODD) service 292. In an embodiment, the ODD service 292 for the peripheral device 291 may also store static or non-adjustable features for the peripheral device 291, such as locations for various ports, physical dimensions of the new peripheral device 291, or physical locations for internal components such as an embedded camera. Model number, device number, serial number media access control (MAC) address, or other identifying information for the peripheral device 291 may also be stored within the ODD service 292 with an ODD for a peripheral device 251, while similar identifying information for the peripheral device 251 in an embodiment may be stored within firmware 253. The ODD for existing peripheral devices or the new peripheral devices includes not only a description of all non-configurable aspects of the peripheral device, as well as the configurable capabilities of such a device, a unique peripheral device identifier such as a serial number, and a peripheral device type classification (e.g., mouse, display, keyboard, webcam, etc.) may be included in the ODD.

The ecosystem manageability sub-agent 290 of the anchor node information handling system 230 in an embodiment may retrieve the functional capabilities for the peripheral device 251 from the firmware 253 via communication with the ecosystem manageability interface 252, which may act as an application programming interface (API), for example, between the firmware 253 and the ecosystem manageability sub-agent 290. Upon purchase, startup, and pairing or operable coupling with the new peripheral device 291 in an embodiment, the anchor node information handling system 290 may gather the functional capabilities for the new peripheral device 291 from the ODD service 292 via the ecosystem manageability interface 293, which may also act as an API between the ODD service 292 and the ecosystem manageability sub-agent 290. The ecosystem manageability sub-agent 290 in an embodiment may gather this information from the various seamless workspace ecosystem maintenance interfaces 252 and 293, for example, upon each detection of operative coupling of the peripheral devices 251 and 291, respectively, with the anchor node information handling system 290, or upon an initial pairing. In an embodiment, the ecosystem manageability sub-agent 290 in an embodiment may transmit the gathered functional capabilities for the peripheral device 251, or the new peripheral device 291 (upon establishment within the peripheral device workspace 250) to the peripheral device workspace cloud orchestrator 280, via the network access point 271a and the integration gateway service 272.

The anchor node information handling system 230 in an embodiment may also include a hardware processor or embedded controller 234 executing code instructions of the ecosystem manageability sub-agent 290. The anchor node 230 in an example embodiment may be operatively coupled to a secondary node peripheral device 251, which may further include a microcontroller executing code instructions of an ecosystem manageability interface 252 and firmware 253. The ecosystem manageability 252 in an embodiment may facilitate communication between the ecosystem manageability sub-agent 290 and the firmware 253 for the secondary node peripheral device 251. Although not shown in FIG. 2, the smart peripheral device 254 may further include internal components facilitating communication of telemetry measurements for the peripheral device 254 to the ecosystem manageability sub-agent 290.

The ecosystem manageability sub-agent 290 in an embodiment may gather, via ecosystem manageability interface 252, various peripheral device operational and environmental context telemetry data readings describing adjustable configurations for the secondary node peripheral device 251 within the peripheral device workspace 250. For example, in an embodiment in which the peripheral device 251 is an external display device, the ecosystem manageability sub-agent 290 may gather telemetry information including a current adjustable operational configuration at the peripheral device 251 for display resolution, display refresh rate, brightness, contrast, color gamut, horizontal view angle, vertical view angle, and response time. As another example, in an embodiment in which the peripheral device 251 is an external webcam, the ecosystem manageability sub-agent 290 may gather telemetry information including a current adjustable operational configuration at the peripheral device 251 for audio/visual connection type (e.g., HDMI, digital audio, etc.), video capture resolution, image depth, video capture refresh rate, or captured frames per second. In still another example, in an embodiment in which the peripheral device 251 is an external microphone, the ecosystem manageability sub-agent 290 may gather telemetry information including a current adjustable operational configuration at the peripheral device 251 for audio output type, audio output frequency, or audio filters (e.g., noise reduction). In yet another example embodiment, in which the peripheral device 251 is an external speaker, the ecosystem manageability sub-agent 290 may gather telemetry information including a current adjustable operational configuration at the peripheral device 251 for audio input type, and audio input frequency. In yet another example embodiment, in which the peripheral device 251 is mouse, touchpad, touchscreen, or keyboard, the ecosystem manageability sub-agent 290 may gather telemetry information including a current adjustable operational configuration at the peripheral device 251 for polling rate, keystroke or button detection, sensitivity levels, power source levels and other settings. Other types of peripheral devices 251 are also contemplated and may include relevant current adjustable operational configuration telemetry data as environmental context data for any peripheral device types as described herein. A similar method of gathering telemetry for a smart peripheral device 254 may also be performed via the ecosystem manageability sub-agent 290 in an embodiment.

The ecosystem manageability sub-agent 290 executing at the information handling system 230 may create a manifest listing each of the peripheral device nodes 251 and 254 within the peripheral device workspace 250, as well as the anchor node 230. The manifest of peripheral device nodes 251 and 254 and other nodes 230 as well as location of a peripheral device workspace 250 may be combined with the peripheral device operational and environmental context telemetry readings for the peripheral device workspace 250 for capabilities and configuration settings and an identification of the anchor node information handling system 230 user into a peripheral device workspace anchor node status update document written in a machine-readable language or machine markup language such as JavaScript Object Notation (JSON), for example, for the peripheral device workspace. The peripheral device workspace anchor node status update document is transmitted for storage with the peripheral device workspace identification value at a peripheral device workspace management system database operating in the peripheral device workspace cloud orchestrator 280. Each time a peripheral device configuration setting is changed by the user, a new peripheral device is added to the peripheral device workspace 250, or changes to environmental context data for the peripheral device workspace 250 are detected, a new peripheral device workspace 250 anchor node status update document including this updated configuration may be transmitted to the peripheral device workspace cloud orchestrator 280.

The anchor node information handling system 230 in an embodiment may be operatively connected to the internet via a network access point (AP) 271a, which may further connect to one or more cloud-based applications, servers, or systems. Such cloud-based applications in an embodiment may include a peripheral device workspace cloud orchestrator 280 which communicates with the remote anchor node information handling system 230 in various peripheral device workspaces 250 and 260, respectively, via an integration gateway service 272. The integration gateway service 272 in an embodiment may operate as an Application Programming Interface (API) or a Query Language (QL) supervisor to control communications to and from the peripheral device workspace cloud orchestrator 280, for example. More specifically, the integration gateway service 272 may, via an API, control the query language in which queries are made to the peripheral device workspace cloud orchestrator 280. As another example, the integration gateway service 272 may use a query language supervisor, such as GraphQL® to control such queries and the format in which results are provided by the peripheral device workspace cloud orchestrator 280. The anchor node 230 may communicate gathered peripheral device telemetry, as well as telemetry specific to the anchor node 230 itself, to the peripheral device workspace cloud orchestrator 280 via this integration gateway service 271a.

Various peripheral device workspaces (e.g., 250 and 260) such as the hybrid work office peripheral device workspaces, collaborative peripheral device workspaces, and other peripheral device workspaces described herein may be defined by location indicator detected for an anchor node information handling system 230 operating at the peripheral device workspace 250, and a manifest of nodes of peripheral devices 251 and smart devices 254 that may operate in the peripheral device workspace 250. Each such defined peripheral device workspace 250 or 260 may also be assigned a peripheral device workspace identification value which may be stored and associated with stored manifests of nodes 230, 251, and 254 operating in the peripheral device workspace 250. Additional environmental context data for the peripheral device workspace 250 may be stored within one or more peripheral device workspace anchor node status update documents as well as included in the definition of the peripheral device workspace and associated with its peripheral device workspace identification value defined at the peripheral device workspace cloud orchestrator 280 server database, including peripheral device capabilities, peripheral device connectivity details, current peripheral device configurations or settings, peripheral device setting or configuration options, current status of the peripheral devices 230, 251, and 254, within the peripheral device workspace 250, and other features of nodes 230, 251, and 254 within the peripheral device workspace 250. For example, the definition of the peripheral device workspace 250 associated with a specific peripheral device workspace identification value may include a set of environmental context data and stored within one or more peripheral device workspace anchor node status update documents, such as time, applications currently executing or planned, connection type, hardware component capabilities or usage metrics, or environmental sensor readings (e.g., humidity, temperature), among other possible environmental context telemetry readings for an anchor node information handling system 230 operating within the defined peripheral device workspace 250.

A peripheral device workspace 250 may be defined by a location, a list of peripheral devices 251 and 254 operatively coupled to an anchor node information handling system 230 for a user, type of peripheral device workspace (e.g., personal, hoteling office/shared, or collaborative), and additionally in some cases, by one or more of the environmental context data for the peripheral device workspace 250 described herein. Each of these defining factors may be associated in a database memory for the peripheral device workspace cloud orchestrator 280 with the peripheral device workspace identification value, which may also be associated with one or more peripheral device operational configuration policies describing how the nodes 230, 251 and 254 within the defined peripheral device workspace 250 are to operate. Thus, a particular peripheral device operational configuration policy for one or more peripheral device nodes 251 or 254 within a given peripheral device workspace 250 having a peripheral device workspace identification value may apply only when certain environmental context telemetries, such as telemetries describing usage patterns for those peripheral device nodes 251 or 254 are detected. In such a way, the peripheral device operational configuration policy for a peripheral device such as 251 or 254 within a peripheral device workspace 250 may be defined or associated with particularly defined usage patterns for that peripheral device. For example, a peripheral device operational configuration policy may apply only when certain software applications are executing at the anchor node information handling system 230 defined within the peripheral device workspace 250, or when one or more hardware components' (e.g., graphics processing unit (GPU), central processing unit (CPU), memory) usage metrics or connectivity metrics meet a predefined threshold.

It is contemplated that each peripheral device workspace 250 or 260 may be at any locations worldwide in which a user connects an information handling system 230 as a primary node to one or more peripheral device 251 or 254 as secondary nodes. In a further aspect, peripheral device workspace 250 or 260 may be in the same physical location, but may contain different groupings of an anchor node and one or more operatively coupled peripheral devices as independent peripheral device workspaces or meshes within a single peripheral device workspace. In a still further aspect, peripheral device workspace 250 or 260 may be in the same or different physical locations and may share the same anchor node 230. In other words, peripheral device workspace 250 may be located at the user's office, peripheral device workspace 260 may be located at the user's home, and a single laptop 230 may operate as the anchor node in both peripheral device workspace 250 and peripheral device workspace 260. In another example, peripheral device workspace 250 and peripheral device workspace 260 may both be located at the user's office, and may include the same laptop anchor node 230, but peripheral device workspace 250 and peripheral device workspace 260 may include different groups of peripheral devices. This may be the case, for example, if the user routinely executes graphics intensive design applications and connects to a 4K high resolution display during the morning hours of each day, then switches to use of a webcam and execution of videoconferencing applications during the afternoon hours of each day.

A database memory for the peripheral device workspace cloud orchestrator 280 may further store a user composite peripheral device workspace identifier that is unique to individual users of one or more defined peripheral device workspaces 250 or 260 that are associated with identification of the user of the user's information handling system 230 and peripheral device workspace identification values of the peripheral device workspaces 250 or 260 used by that user. Thus, a user composite peripheral device workspace identifier may identify a single user of an anchor node information handling system 230, and a peripheral device workspace identification value for each of one or more peripheral device workspaces 250 or 260 in which the user's information handling system 230 operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric.

As described herein, a user may purchase a new peripheral device, such as 291 via the product purchase platform 273 which is executable code instructions executing on a product purchase platform server. The new peripheral device 291 may then be added to one of the user peripheral device workspaces 250 or 260. In an embodiment in which a new peripheral device 291 is purchased by the user from the product purchase platform 273, which is in communication with and accessible or manageable by the peripheral device workspace cloud orchestrator 280 executing on a peripheral device workspace cloud orchestrator server, the range of functional capabilities for the peripheral device 291, a unique peripheral device identifier, and a peripheral device classification may be stored at an orchestration device descriptor (ODD) service 292 in an ODD assigned to the peripheral device 291. In an embodiment, the ODD service 292 is executable code instructions and data files for the peripheral device 291 that may also store static or non-adjustable features for the peripheral device 291, such as locations codes for various ports, physical dimensions of the new peripheral device 291, or physical locations for internal components such as an embedded camera. Model number, device number, media access control (MAC) address, type classification of the new peripheral device 291 or other identifying information for the peripheral device 291 may also be stored within the ODD service 292, while similar identifying information for the peripheral device 291 in an embodiment may be stored within firmware 294.

As shown in FIG. 2, the user may already have one or more already-established or pre-existing peripheral device nodes, such as 251 and 254, operatively coupled to the anchor node information handling system 230 within the peripheral device workspace 250. These established or pre-existing peripheral devices, such as 251 and 254, may be referred to herein as "existing peripheral devices," and the functional capabilities for these existing peripheral devices 251 and 254 may be referred to herein as "existing functional capabilities." In contrast, the functional capabilities for the new peripheral device 291 may be referred to herein as "new peripheral device functional capabilities." It is contemplated that the existing peripheral devices, such as 251 or 254 may also include ODD services with an assigned ODD for each.

The ecosystem manageability sub-agent 290 of the anchor node information handling system 230 may execute code instructions in an embodiment to retrieve the functional capabilities for the peripheral device 251 from the firmware 253 via communication with the ecosystem manageability interface 252, which may act as an application programming interface (API), for example, between the firmware 253 and the ecosystem manageability sub-agent 290. A similar system may be operational at smart peripheral device 254, however the smart peripheral device 254 may have network communication capabilities and may provide such ODD information via such a networking system in some embodiments. Upon purchase, startup, and pairing or operable coupling with the new peripheral device 291 in an embodiment, the code instructions for the ecosystem manageability sub-agent 290 at the anchor node information handling system 290 may execute to gather the functional capabilities for the new peripheral device 291 from the ODD service 292 in an ODD via the ecosystem manageability interface 293, which may also act as an API between the ODD service 292 and the ecosystem manageability sub-agent 290. The peripheral device workspace cloud orchestrator 280 in an embodiment may determine the best configurations for newly added peripheral device 291, as described below with respect to FIGS. 3 and 5, for a given peripheral device workspace, such as 250 or 260, based on the user's past configurations for already established peripheral devices 251 and 254 when sufficient similarity matching is determined according to embodiments herein.

As described in greater detail below with respect to FIGS. 3 and 5, upon receipt of a peripheral device operational configuration policy for the new peripheral device 291 at the anchor node 230 of the peripheral device workspace 250, the anchor node information handling system 230 may implement the firmware configurations or other configuration settings contained therein. For example, such a peripheral device operational configuration policy in an embodiment may instruct the ecosystem manageability sub-agent 290 at the anchor node 230 to adjust settings for firmware 294 via the ecosystem manageability interface 293. More specifically, in an embodiment in which the peripheral device 291 is an external display device, the ecosystem manageability sub-agent 290 may execute an instruction according to a received peripheral device operational configuration policy to adjust or setup an adjustable operational configuration at the peripheral device 291 for display resolution, display refresh rate, brightness, contrast, color gamut, horizontal view angle, vertical view angle, and response time. As another example, in an embodiment in which the peripheral device 291 is an external webcam, the ecosystem manageability sub-agent 290 may execute an instruction according to a received peripheral device operational configuration policy to adjust or setup an adjustable operational configuration at the peripheral device 291 for audio/visual connection type (e.g., HDMI, digital audio, etc.), video capture resolution, image depth, video capture refresh rate, or captured frames per second. In still another example, in an embodiment in which the peripheral device 291 is an external microphone, the ecosystem manageability sub-agent 290 may execute an instruction according to a received peripheral device operational configuration policy to adjust or setup an adjustable operational configuration at the peripheral device 291 for audio output type, audio output frequency, or audio filters (e.g., noise reduction). In yet another example embodiment, in which the peripheral device 291 is an external speaker, the ecosystem manageability sub-agent 290 may execute an instruction according to a peripheral device operational configuration policy to adjust or setup an adjustable operational configuration at the peripheral device 291 for audio input type, and audio input frequency. In yet another example embodiment, in which the peripheral device 291 is an I/O device such as a mouse, touchpad, keyboard or similar, the ecosystem manageability sub-agent 290 may execute an instruction according to a peripheral device operational configuration policy to adjust or setup an adjustable operational configuration at the peripheral device 291 for polling rate, keystroke or button detection, sensitivity levels, and other configuration settings. In such a way, execution of code instructions of the peripheral device workspace cloud orchestrator may automatically update peripheral device configurations as new peripheral devices are added to an existing peripheral device workspace.

Figure 3:
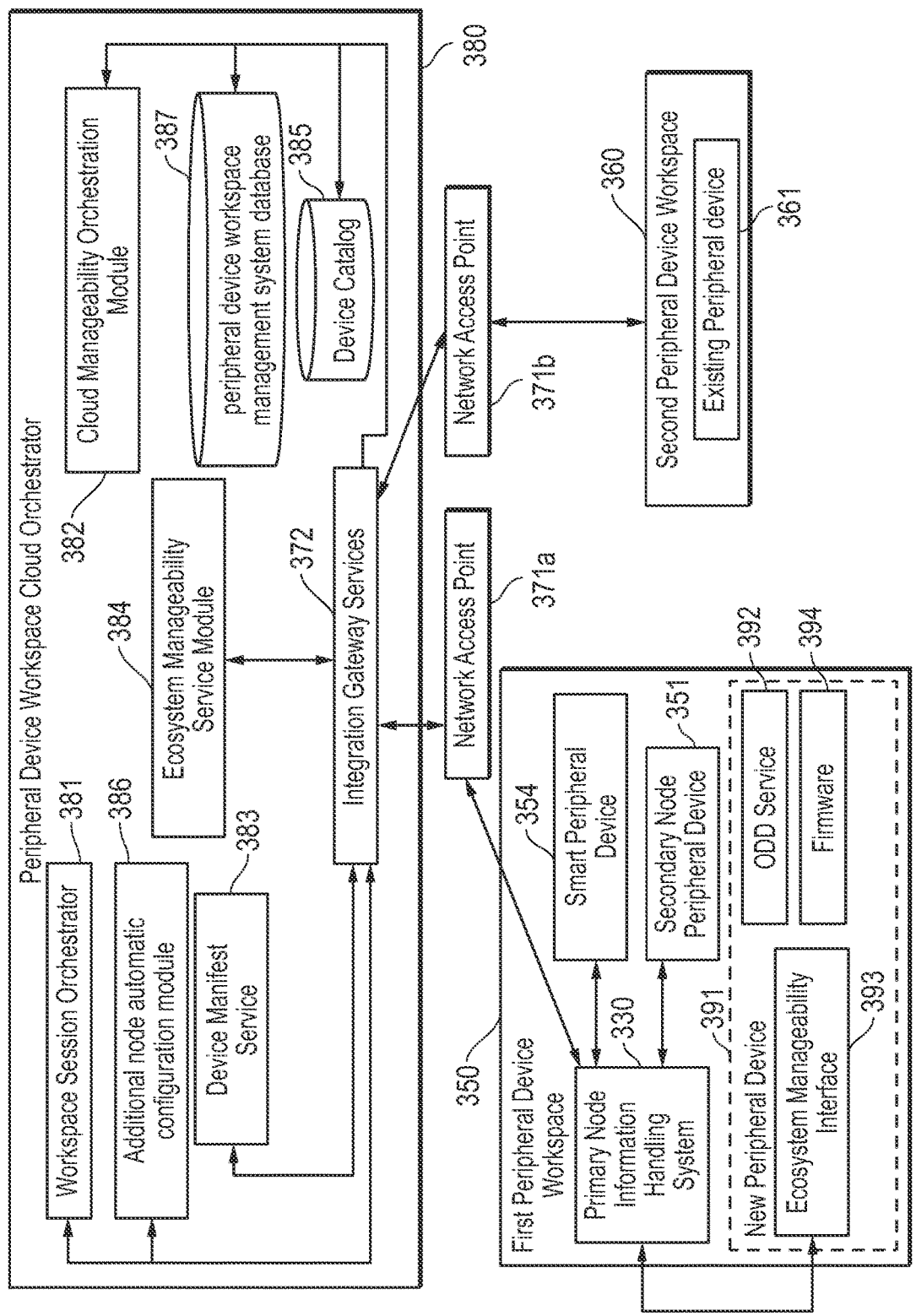
FIG. 3 is a block diagram illustrating a new peripheral device in a peripheral device workspace interfacing with a peripheral device workspace cloud orchestrator server to be automatically configured using default or previously user-selected adjustable operational configurations from the user's matching peripheral device according to an embodiment of the present disclosure.

FIG. 3 is a block diagram illustrating code instructions for a peripheral device workspace cloud orchestrator executing at a remote peripheral device workspace cloud orchestrator server or servers for automatically configuring a new peripheral device using previously user-selected adjustable operational configurations from a matching peripheral device in an established peripheral device workspace associated with the purchasing user according to an embodiment of the present disclosure. As described previously, code instructions for the peripheral device workspace cloud orchestrator 380 may be executed in an embodiment to automatically update peripheral device configurations as new peripheral devices (e.g., 391) are added to the user's various peripheral device workspaces 350 and 360. The code instructions for the cloud-based peripheral device workspace cloud orchestrator 380 in an embodiment may also be executed in communication with a cloud-based product purchase platform 373 executing at a purchase platform server, which may include a manufacturer's or distributor's website for sale and purchase of new information handling systems or new peripherals (e.g., 391) for use in new or existing peripheral device workspaces 350 or 360 associated with a user. A user may wish to automatically configure a newly purchased peripheral device 391 in the same way that similar peripheral devices 351 or 354 (e.g., those being replaced by the new or updated peripheral devices) were configured, and for various peripheral device workspaces 350 or 360 and environmental contexts determined from peripheral device workspace environmental context data already associated with that peripheral device workspace for that user.

In order to automatically configure a newly purchased peripheral device 391 in such a way, code instructions of the peripheral device workspace cloud orchestrator 380 may be executed to allow the peripheral device workspace cloud orchestrator 380 to access the range of functional capabilities for the peripheral device 391 upon purchase by a user registered with the peripheral device workspace cloud orchestrator 380 that may be included within an ODD for that new peripheral device 391. The ODD for existing peripheral devices or the new peripheral devices further includes a description of all non-configurable aspects of the peripheral device, as well as the configurable capabilities of such a device, a unique peripheral device identifier such as a serial number, and a peripheral device type classification (e.g., mouse, display, keyboard, webcam, etc.). As described herein, each such registered user may be associated with a user composite peripheral device workspace identifier, generated and maintained by the peripheral device workspace cloud orchestrator 380 and with data such as configuration settings stored for each of the nodes (e.g., 330, 351, and 354) of a peripheral device workspace (e.g., 350). During uses of the user at a peripheral device workspace such as 350, different types of usages may occur, such as use of an office for teleconference meetings versus design work with software systems for example. These uses of the user may require differing configuration settings of each of the nodes in some embodiments and such configuration settings may be assigned an experience identification value (xID) associated with the peripheral device workspace and for a particular user in the user composite peripheral device workspace identifier This user composite peripheral device workspace identifier for each user may include an identification of a single user, the plurality of peripheral device workspaces 350 and 360 associated with that user, and the plurality of peripheral devices 351 and 354 that have been operatively coupled to the user's information handling system 330, as well as peripheral device operational and environmental context telemetry readings previously received by the peripheral device workspace cloud orchestrator 380 from the information handling system 330 or from smart peripheral devices such as 354 that may provide one or more xIDs for a peripheral device workspace. As described in greater detail below, the code instructions of the cloud manageability orchestration module 382 may also be executed to generate, retrieve, and transmit peripheral device operational configuration policies defining adjustable operational configurations according to which one or more existing peripheral devices 351, 354, or 361, or the new peripheral device 391 may operate within the peripheral device workspace 350 or 360, respectively. The cloud manageability orchestration module 382 may also execute code instructions to manage and store at the peripheral device workspace management system database 387 an association via the user composite peripheral device workspace identifier between the user, each peripheral device workspace (e.g., 350 or 360) in which the user's information handling system 330 has previously operated, previously received peripheral device operational and environmental context telemetry readings for that user and those peripheral device workspaces 350 and 360, and each peripheral device 351, 354, and 361 that has been operatively coupled to the information handling system 330 within those peripheral device workspaces 350 or 360 as part of one or more xIDs for the user in such a peripheral device workspace.

Upon purchase of a new peripheral device 391 in an embodiment by a user associated with a known user composite peripheral device workspace identifier, the device manifest service 383 may receive notification from the product purchase platform (e.g., 273 of FIG. 2) of a purchase by an identified user of a new peripheral device 391. Code instructions of the device manifest service 383 in an embodiment may then instruct the ecosystem manageability service module 384 to generate an orchestrated device descriptor (ODD) for the newly purchased peripheral device 391, including a unique peripheral device identifier, a peripheral device type classification, all fixed specifications and capabilities and user-adjustable functional capabilities for the newly purchase peripheral device 391. The ecosystem manageability service module 384 in an embodiment may execute code instructions to generate, maintain, and cross-reference ODDs and the functional capabilities for devices listed therewithin. As described herein, the ODD for existing peripheral devices or the new peripheral devices further includes a description of all non-configurable aspects of the peripheral device, as well as the configurable capabilities of such a device, a unique peripheral device identifier such as a serial number, and a peripheral device type classification (e.g., mouse, display, keyboard, webcam, etc.).

Code instructions for the ecosystem manageability service module 384 in an embodiment may be executed to retrieve these user-adjustable functional capabilities from a device catalog 385, which may store all adjustable functional capabilities, as well as static or non-adjustable features for all peripheral devices or information handling systems made available for purchase via the product purchase platform (273 of FIG. 2). Default configurations for any adjustable operational configurations for the newly purchased peripheral device 391 may also be retrieved by the ecosystem manageability service module 384 from the device catalog 385. Code instructions for the ecosystem manageability service module 384 may be executed to retrieve from the device catalog 385 static or non-adjustable features for the peripheral device 391, such as locations for various ports, physical dimensions of the new peripheral devices, or physical locations for internal components such as an embedded camera. Model number, device number, serial number, media access control (MAC) address, or other identifying information for the peripheral devices available for purchase may also be retrieved from the device catalog 385 in an embodiment. All of this information retrieved from the device catalog 385 may be stored at the peripheral device workspace management system database 387 of the peripheral device workspace cloud orchestrator 380 for each newly purchased peripheral device 391, and listed by device unique identifier as part of an ODD for the peripheral device 391.

Upon shipment of the newly purchased peripheral device 391 to the user and initial pairing of that device 391 with the user's information handling system 330 or the smart peripheral device 354, the anchor node 330 or the smart peripheral device 354 may notify the peripheral device workspace cloud orchestrator 380 of this initial pairing or operative coupling. The information handling system 330 to which the newly purchased peripheral device 391 is operatively coupled in an embodiment may then discover all operatively coupled peripheral devices. For example, in an embodiment in which the new peripheral device 391 is operatively coupled to the information handling system 330 within the existing peripheral device workspace 350, the ecosystem manageability sub-agent on the information handling system 330 may identify operative coupling with the smart peripheral device 354, the secondary node peripheral device 351 and the new peripheral device 391.

As described in greater detail above with respect to FIG. 2, the ecosystem manageability sub-agent on the information handling system 330 may then gather peripheral device operational and environmental context telemetry readings within the peripheral device workspace 350, including current adjustable operational configurations for the information handling system 330, the smart peripheral device 354, the secondary node peripheral device 351 and the new peripheral device 391. In addition, the ecosystem manageability sub-agent on the information handling system 330 may gather device functional capabilities for each of these peripheral devices 351, 354, and 391 via the firmware on each device, or via the ODD service (e.g., 392). More specifically, code instructions for the ecosystem manageability sub-agent on the information handling system 330 may then execute to gather peripheral device operational and environmental context telemetry data, including current adjustable operational configurations for the information handling system 330, the smart peripheral device 354, the secondary node peripheral device 351 and the new peripheral device 391 in the peripheral device workspace 350. In addition, the code instructions for the ecosystem manageability sub-agent on the information handling system 330 may execute to gather device functional capabilities for each of these peripheral devices 351, 354, and 391 via the firmware on each device, or via the ODD service (e.g., 392). The code instructions for the ecosystem manageability sub-agent on the information handling system 330 in such an embodiment may then execute to transmit this information, as well as the user composite peripheral device workspace identifier for the user, in the form of a peripheral device workspace anchor node status update document to the ecosystem manageability service module 384 via the integration gateway services 372.

The cloud manageability orchestrator module 384 in an embodiment may receive the peripheral device workspace anchor node status update document described directly above, identifying the newly purchased peripheral device 391 by unique identifier (e.g., serial number), as well as the manifest of other nodes 330, 351, and 354, within the previously established peripheral device workspace 350. Code instructions for the cloud manageability orchestrator module may execute to access the user composite peripheral device workspace identifier also received in the peripheral device workspace anchor node status update document and to identify all peripheral device workspaces (e.g., 350 and 360) having peripheral device workspace identification values included within the user composite peripheral device workspace identifier as well as any xID values for various configuration settings for a user at such peripheral device workspaces.

As described herein, a peripheral device workspace 350 may be an ecosystem of node devices 351, 354, and 391 connected to a primary or anchor node device such as the information handling system 330. In an embodiment, a peripheral device workspace 350 may also be defined with a peripheral device workspace identification value and part of a user composite peripheral device workspace identifier associated with each of the information handling system 330 and peripheral devices 351, 354, and 391. Code instructions for the cloud manageability orchestrator module 382 may execute to determine that the unique identifier (e.g., serial number) for the newly added peripheral device 391 does not match any unique identifiers associated with the user composite peripheral device workspace identifier. This may indicate a need to configure the newly purchased peripheral device 391 for use within the already established peripheral device workspace 350 to which the user has added the newly purchased peripheral device 391. Code instructions for the cloud manageability orchestrator module 382 in an embodiment may then execute to notify an additional node automatic configuration module 386 that such a newly purchased peripheral device 391 has been added to an existing peripheral device workspace 350, and may identify the newly purchased peripheral device 350 using the unique identifier for that device as received within the peripheral device workspace anchor node status update document.

The code instructions for the additional node automatic configuration module 386 in an embodiment may execute to retrieve the ODD for the newly purchased peripheral device 391. The functional capabilities for the newly purchased peripheral device 391 within this ODD in an embodiment may be used for comparison against existing functional capabilities for other peripheral devices (e.g., 351, 354) identified in the user composite peripheral device workspace identifier. The newly purchased peripheral device ODD in an embodiment may also be used to compare previously applied adjustable operational configurations for those existing functional capabilities in previously received peripheral device workspace anchor node status update documents. Further, the adjustable operation configurations may include a range of configuration settings based on one or more experience identification (xID) values for usages by a user at a peripheral device workspace 350. These comparisons may indicate whether to configure the newly purchased peripheral device 391 in the same way that other, previously used peripheral devices such as 351 or 354 have also been configured.

Code instructions for the additional node automatic configuration module 386 in an embodiment may execute to access the peripheral device workspace anchor node status update document indicating that the new peripheral device 391 has been operatively coupled to the information handling system 330 whose user is already associated with a user composite peripheral device workspace identifier. As described herein, the user may wish to configure a new peripheral device 391 in the same way as an existing peripheral device (e.g., 361) only if they are associated with the same peripheral device workspaces and have matching capabilities. In other words, code instructions for the additional node automatic configuration module 386 in an embodiment may be executed to recommend previously-used, adjustable operational configurations for existing peripheral devices to instruct operation of the new peripheral device 391 only if those previously-used, adjustable operational configurations were applied to another existing peripheral device (e.g., 351) that has previously operated within the same peripheral device workspace (e.g., 350) in which the new peripheral device 391 is currently operating.

The additional node automatic configuration module 386 in an embodiment may execute code instructions to determine whether the device functional capabilities stored within the ODD for the new peripheral device 391 match any existing functional capabilities for other peripheral devices, such as 351, 354, or 361 associated with the user of the information handling system 330 within its associated user composite peripheral device workspace identifier from those ODDs and any variations depending on one or more xIDs at the peripheral device workspace. This may occur, for example, if the user purchased the new peripheral device 391 to replace a broken or lost peripheral device of the same model or having matching functional capabilities.

As described herein, an information technology decision maker (ITDM) for an enterprise, or the user of the information handling system may define a minimum percentage of features or capabilities between two comparable peripheral devices that must match in order to recommend that two comparable peripheral devices be configured in the same way. For example, a user or an ITDM may require that 80 percent overlap of functional capabilities for two separate peripheral devices be identical to one another in order to recommend that both devices be configured according to the same peripheral device workspace operational configuration policy that defines one or more adjustable operational configurations for the two comparable devices. This may be determined from the ODD of compared peripheral devices and from the number of overlapping fixed specification and capabilities and user adjustable configuration settings ranges for capabilities between the compared peripheral device nodes. This is only an example of one threshold value, and other minimum requirements for identity of functional capabilities between two different peripheral devices in embodiments may include any value from one to one hundred (e.g., 50%, 75%, 90%, etc.).

In the case where the new peripheral device 391 meets a capability matching minimum percentage of 80%, for example, this may indicate that the user purchased an upgraded version of an existing peripheral device (e.g., 351 in peripheral device workspace 350 or 361 in a second peripheral device workspace 360) already associated with the user composite peripheral device workspace identifier. In such a case, the user may wish to initially set up the new peripheral device 391 with the same adjustable operational configuration as the existing peripheral device (e.g., 351 or 361) with matching functional capabilities (e.g., meeting the minimum matching percentage threshold) that is already associated with the user composite peripheral device workspace identifier. If the functional capabilities of the new peripheral device 391 match functional capabilities for any existing peripheral device, such as 351 or 361, associated with the user composite peripheral device workspace identifier in an embodiment, the code instructions for the additional node automatic configuration module 386 may be executed to notify the cloud manageability orchestration module 382 of such a match.

The additional node automatic configuration module 386 in such an embodiment may then execute code instructions at any of one or more peripheral device workspace cloud orchestrator servers to determine whether the list of peripheral devices 351, 354, and 361 to which the information handling system 330 is currently operatively coupled matches the peripheral device list for any existing peripheral devices workspaces (e.g., 350 and 360) associated with the user composite peripheral device workspace identifier. As described herein, an ITDM for an enterprise, or the user of the information handling system may define a minimum percentage between two comparable peripheral device workspaces (e.g., 350 prior to addition of 391 and 350 after addition of 391) that must match in order to recommend that two comparable peripheral devices (e.g., 391 and 351) be configured in the same way. Additionally, a minimum percentage of operational capabilities and features between peripheral devices (as identified by unique serial number and in an associated ODD) must also match, as operating within a matching peripheral device workspace in order to recommend applying settings of an existing peripheral device (e.g., 351) be applied to a new peripheral device (e.g., 391). For example, a user or an ITDM may require that 50 percent of peripheral devices for two separate peripheral device workspaces (e.g., 350 prior to addition of 391 and 350 after addition of 391) overlap to one another in order to recommend that devices that have threshold levels of minimum percentage of operational capabilities and features between two comparable peripheral devices be configured according to the same peripheral device workspace operational configuration policy that defines one or more adjustable operational configurations for the two comparable peripheral devices. This is only an example of one threshold value as between distinct peripheral device workspaces, and if replacing a peripheral device within a same peripheral device workspace, the overlap percentage would be 100%. Still other minimum requirements for identity of operational capabilities and static features of each of the peripheral devices between two different peripheral device workspaces in embodiments may also be required. Overlap among different peripheral device workspaces may include any threshold value from one to one hundred (e.g., 20%, 30%, 60%, etc.).

For example, in an embodiment in which the new peripheral device 391 is operatively coupled to the information handling system 330, which is also operatively coupled to peripheral devices 351 and 354, 66% of the matching peripheral devices 351 and 354 that are identified within the most recently generated manifest for a peripheral device workspace into which a new peripheral device is to be used match the peripheral devices 351 and 354 previously associated with peripheral device workspace 350. If the workspace matching minimum percentage is set to say 50%, then the 66% match rate may exceed the workspace matching minimum percentage. Code instructions for the additional node automatic configuration module 386 in an embodiment may then be executed to notify the cloud manageability orchestration module 382 of this match for a peripheral device. Additionally, a match of functional capabilities and static features of an existing peripheral device, such as 351, to a newly added peripheral device 391 at another threshold percentage as determined from ODDs for the compared peripheral devices may be required for application of settings from the previous existing peripheral device.

In an embodiment in which either the peripheral device workspace or the functional capabilities and static features do not match, as described with respect to embodiments directly above, the cloud manageability orchestration module may execute code instructions to create a default peripheral device operational configuration policy for the newly purchased peripheral device using default adjustable operational configuration values stored in the ODD for the newly purchased peripheral device. For example, the cloud manageability orchestration module 382 in an embodiment may access the ODD for the new peripheral device 391 within the peripheral device workspace anchor node status update document to identify one or more default peripheral device operational configurations. As described herein, the ODD may include a list of adjustable operational configurations and default operational configurations for configurable features of the newly purchased peripheral device. The cloud manageability orchestration module may execute code instructions to generate a default peripheral device operational configuration policy instructing the new peripheral device 391 to execute according to one or more default peripheral device adjustable operational configurations defined within the ODD for the newly purchased peripheral device 391.

In an embodiment in which the peripheral device workspaces and the functional capabilities between two peripheral devices including the newly purchased peripheral device match in overlap at a threshold percentage, the cloud manageability orchestration module may execute code instructions to retrieve an existing peripheral device operational configuration policy for one of the matching peripheral devices within an existing peripheral device workspace for configuration of the newly purchased peripheral device. When a newly added peripheral device 391 is being added to a peripheral device workspace such as 350 having an overlapping existing peripheral device 351 that matches it, then the percentage of overlap of peripheral device workspaces is 100%, and the system may assess functional capabilities and static features between the comparable existing peripheral device and the newly added peripheral device 391. This may occur when the newly added peripheral device 391 is meant to replace an existing peripheral device in a peripheral device workspace in one example embodiment. As described herein, when the functional capabilities for the new peripheral device and an existing peripheral device are sufficiently similar, this may indicate that the user may wish to initially set up the new peripheral device with the same adjustable operational configuration as the existing peripheral device with matching functional capabilities. In such an embodiment, code instructions for the cloud manageability orchestration module 382 may be executed to identify a peripheral device operational configuration policy stored within the peripheral device workspace management system database 387 including one or more adjustable operational configurations for the matching existing peripheral device (e.g., 351 or 361) that has previously operated within the same peripheral device workspace 350 or a different peripheral device workspace 360 meeting a peripheral device workspace matching threshold. In some embodiments, sufficient matching of peripheral device workspaces may be less emphasized for some types of peripheral devices or may not be considered relative to matching overlap of functional capabilities and static features between comparable peripheral devices.

Code instructions for the ecosystem manageability service module may execute to transmit the existing peripheral device operational configuration policy or default peripheral device operational configuration policy generated for the newly purchased peripheral device for implementation at the anchor node and the newly purchased peripheral device within the peripheral device workspace. For example, code instructions for the ecosystem manageability service module 384 in an embodiment may be executed to transmit the existing peripheral device operational configuration previously applied to a matching peripheral device 351 that previously operated within the same existing peripheral device workspace 350 in which the new peripheral device 391 is currently operating to the anchor node information handling system 330 of the peripheral device workspace 350. In another embodiment, code instructions for the ecosystem manageability service module 384 in an embodiment may be executed to transmit the existing peripheral device operational configuration previously applied to a matching peripheral device 361 that previously operated within a different peripheral device workspace 360 meeting a matching criteria for the new peripheral device 391 currently operating with the anchor node information handling system 330 of the peripheral device workspace 350. In yet another example, code instructions for the ecosystem manageability service module 384 in an embodiment may be executed to transmit a default peripheral device operational configuration to the anchor node information handling system 330 of the peripheral device workspace 350 when matching of a comparable peripheral device is insufficient to meet an overlap threshold.

Upon receipt of the new or existing peripheral device operational configuration policy at the ecosystem manageability sub-agent of the information handling system 330, the newly purchased peripheral device 391 may be configured according to that received peripheral device operational configuration policy. As the user continues to use this newly purchased peripheral device 391 in various peripheral device workspaces (e.g., 350 or 360) and contexts, new peripheral device workspace anchor node status update documents may be generated that include configuration settings for the newly purchased peripheral device 391, as described above with respect to FIG. 2. The peripheral device workspace cloud orchestrator 380 may continue to gather such peripheral device workspace anchor node status update documents and adjust peripheral device operational configuration policies associated with this newly purchased peripheral device 391 according to changes in peripheral device workspace (e.g., 350 or 360) and context, as was performed with previously operatively coupled peripheral devices 351, 354 and 361. In such a way, the peripheral device workspace cloud orchestrator 380 may automatically update peripheral device configurations as the user peripheral device workspace 350 and 360 and context change and as new peripheral devices 391 are added to the user's various peripheral device workspaces 350 and 360.

Figure 4:
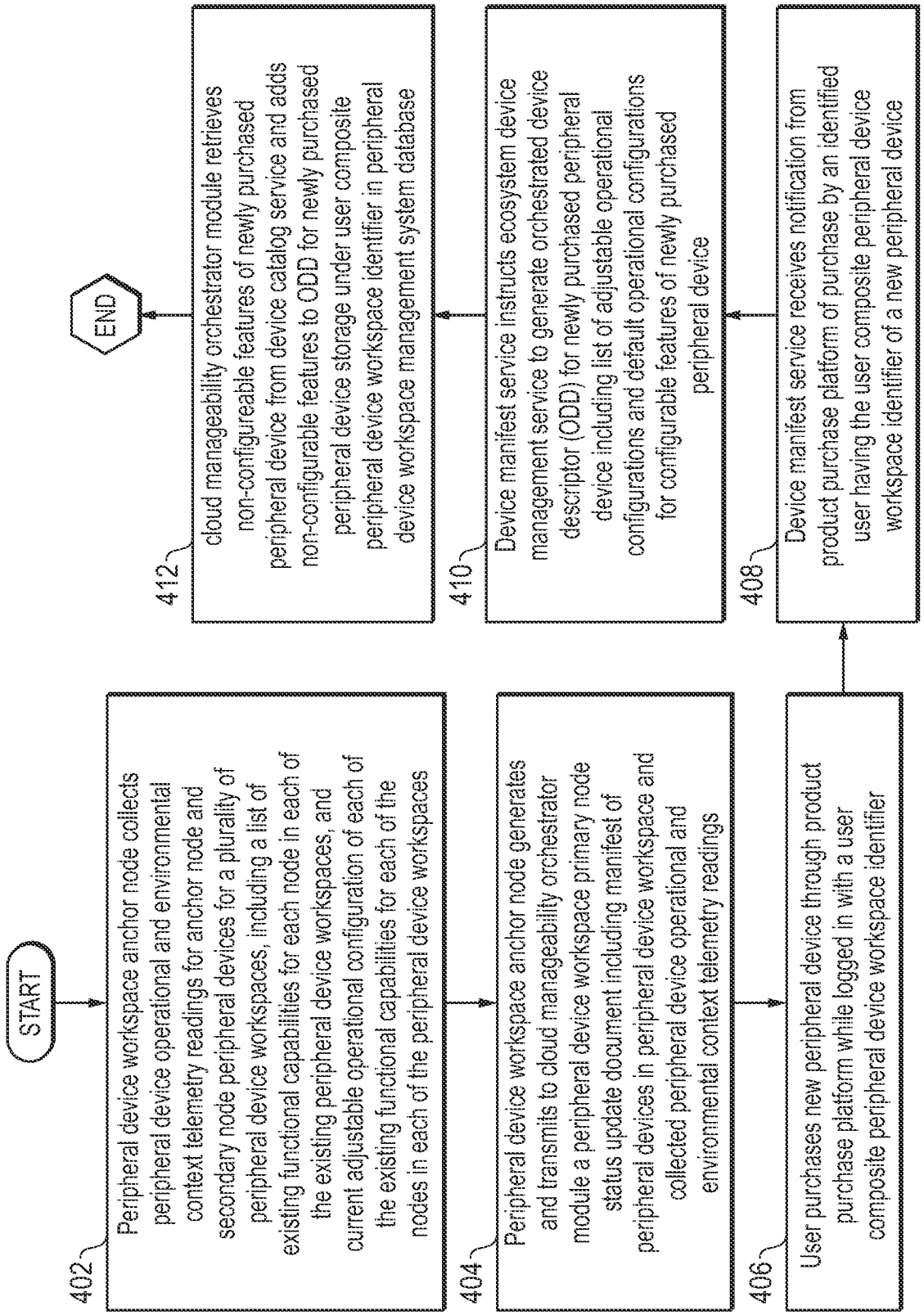
FIG. 4 is a flow diagram illustrating a method of collecting peripheral device functional capabilities for comparison to determine suitability of common adjustable operational configurations according to an embodiment of the present disclosure.

FIG. 4 is a flow diagram illustrating a method of collecting peripheral device functional capabilities for existing and newly added peripheral devices within a defined peripheral device workspace for comparison to determine suitability of application of the same adjustable operational configurations to the newly added peripheral device and one or more existing peripheral devices according to an embodiment of the present disclosure.

At block 402, a peripheral device workspace anchor node in an embodiment may collect peripheral device operational and environmental context telemetry readings for the anchor node and secondary node peripheral devices for a plurality of peripheral device workspaces over time. This may include a list of existing functional capabilities for each node in each of the existing peripheral device workspaces, and current adjustable operational configuration of each of the existing functional capabilities for each of the nodes in each of the peripheral device workspaces where and when communication and retrieval of such environmental context telemetry is available. For example, as described in an embodiment with respect to FIG. 1, peripheral device operational and environmental context telemetry readings gathered pursuant to execution of code instructions for an ecosystem manageability sub-agent 172 in an embodiment may include, for example, information specific to the information handling system 100, or the operative connection between the information handling system 100 and the peripheral devices 142 when in one or another peripheral device workspace. More specifically, the peripheral device operational and environmental context telemetry readings gathered pursuant to execution of code instructions for the ecosystem manageability sub-agent may include, for the information handling system 100, a current power mode (e.g., sleep mode, battery mode, operational mode, powered down), range of possible power modes, current time, geographic location for the peripheral device workspace that includes the information handling system 100, current execution of a specific software application, hardware processor 102 or 104 utilization rate, memory 106, 108, or 120 utilization rate, remaining battery power for battery 124. In another example embodiment, the peripheral device operational and environmental context telemetry readings gathered pursuant to execution of code instructions for the ecosystem manageability sub-agent 172 may include measured values for the wired or wireless link operatively coupling the one or more of the peripheral devices 142 to the information handling system 100, such as throughput metric, received signal strength indicator (RSSI), wireless protocol (e.g., WLAN, WWAN, WPAN, Bluetooth®, BLE), or measured number of dropped packets.

In another example embodiment described with respect to FIG. 2, code instructions for the ecosystem manageability sub-agent 290 in an embodiment may execute to gather, via an ecosystem manageability interface 252 at one or more secondary node peripheral devices, various peripheral device operational and environmental context telemetry readings describing operational capabilities for the one or more secondary node peripheral devices such as 251 within the peripheral device workspace 250, as well as adjustable operational configurations for those operational capabilities. For example, in an embodiment in which the peripheral device 251 is an external display device, the code instructions of the ecosystem manageability sub-agent 290 may execute to gather peripheral device operational and environmental context telemetry readings including a current adjustable operational configuration at the peripheral device 251 for display resolution, display refresh rate, brightness, contrast, color gamut, horizontal view angle, vertical view angle, and response time. As another example, in an embodiment in which the peripheral device 251 is an external webcam, the code instructions for the ecosystem manageability sub-agent 290 may execute to gather peripheral device operational and environmental context telemetry readings including a current adjustable operational configuration at the peripheral device 251 for audio/visual connection type (e.g., HDMI, digital audio, etc.), video capture resolution, image depth, video capture refresh rate, or captured frames per second. In still another example, in an embodiment in which the peripheral device 251 is an external microphone, code instructions for the ecosystem manageability sub-agent 290 may execute to gather peripheral device operational and environmental context telemetry readings including a current adjustable operational configuration at the peripheral device 251 for audio output type, audio output frequency, or audio filters (e.g., noise reduction). In yet another example embodiment, in which the peripheral device 251 is an external speaker, code instructions for the ecosystem manageability sub-agent 290 may execute to gather peripheral device operational and environmental context telemetry readings including a current adjustable operational configuration at the peripheral device 251 for audio input type, and audio input frequency.

Code instructions for the ecosystem maintenance sub-agent executing at the anchor node in an embodiment may also execute to retrieve functional capabilities for the peripheral devices from each of the operatively coupled peripheral devices in each of a plurality of peripheral device workspaces. For example, the code instructions for the ecosystem manageability sub-agent 290 operating at the anchor node 230 may execute to gather peripheral device operational and environmental context telemetry readings regarding the range of capabilities for each peripheral device (e.g., 251 and 254). In the case where the peripheral device 251 has already been purchased and set up by the user within one of the peripheral devices workspaces, such as 250, the information defining the range of functional capabilities for the peripheral device 251 may be stored at the peripheral device 251, within the firmware 253. In another embodiment, in which a new peripheral device 291 is purchased by the user from the product purchase platform 273, which is in communication with and accessible or manageable by the peripheral device workspace cloud orchestrator 280, the range of functional capabilities for the peripheral device 291 may be stored at an orchestration device descriptor (ODD) service 292. In an embodiment, the ODD service 292 the peripheral device 291 may also store static or non-adjustable features for the peripheral device 291, such as locations for various ports, physical dimensions of the new peripheral device 291, or physical locations for internal components such as an embedded camera. Model number, device number, media access control (MAC) address, or other identifying information for the peripheral device 291 may also be stored within the ODD service 292, while similar identifying information for the peripheral device 251 in an embodiment may be stored within firmware 253.

The ecosystem manageability sub-agent 290 of the anchor node information handling system 230 may execute code instructions in an embodiment to retrieve the functional capabilities for the peripheral device 251 from the firmware 253 via communication with the ecosystem manageability interface 252, which may act as an application programming interface (API), for example, between the firmware 253 and the ecosystem manageability sub-agent 290. Upon purchase, startup, and pairing or operable coupling with the new peripheral device 291 in an embodiment, the code instructions for the ecosystem manageability sub-agent 290 at the anchor node information handling system 290 may execute to gather the functional capabilities for the new peripheral device 291 from the ODD service 292 via the ecosystem manageability interface 293, which may also act as an API between the ODD service 292 and the ecosystem manageability sub-agent 290. The ODD may include a unique peripheral device identification as well as an environmental telemetry data set describing the peripheral device operational and environmental context telemetry readings regarding the range of capabilities for each peripheral device (e.g., 251 and 254).

The peripheral device workspace anchor node in an embodiment at block 404 may generate and transmit to the cloud manageability orchestrator module a peripheral device workspace anchor node status update document including manifest of peripheral devices in peripheral device workspace and collected peripheral device operation and environmental context telemetry readings for a peripheral device workspace location identified by a location identifier. For example, in an embodiment described with respect to FIG. 1, code instructions for the ecosystem manageability sub-agent 172 executing at the information handling system 100 in a peripheral device workspace may create a manifest of peripheral device nodes 142 and other nodes for a peripheral device workspace identification value to represent the current peripheral device workspace (e.g., 250 or 260 in FIG. 2), including an identification of the location, and an identification (e.g., by product serial number or other peripheral device identification) of each of the peripheral device nodes 142 connected to or operably coupled to the anchor information handling system 100 at a peripheral device workspace.

The hardware processor 102 of the user anchor information handling system 100 may execute code instructions of the ecosystem manageability sub-agent 172 to also collect one or more peripheral device operational and environmental context telemetry readings (e.g., time, applications executing, hardware component usage metrics, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational and environmental context telemetry readings for the peripheral device workspace and an identification of the anchor node information handling system 100 user into a peripheral device workspace anchor node status update document written in a machine-readable language or machine markup language such as JavaScript Object Notation (JSON), for example, to be associated with a peripheral device workspace identification value.

This peripheral device workspace anchor node status update document is transmitted for storage with the peripheral device workspace identification value at a peripheral device workspace management system database 167 operating in the peripheral device workspace cloud orchestrator 156. Each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator 156 for association with the peripheral device workspace identification value for the peripheral device workspace. Additionally, values for the ODD of each peripheral device in the manifest of peripheral devices in the peripheral device workspace may also be updated with these changes. Similarly, a given set of configuration settings operated by a user for a period of time may establish an xID for the user's user composite peripheral device workspace identifier to record usages of the peripheral devices by a user in a peripheral device workspace.

At block 406, a user associated with a user composite peripheral device workspace identifier may purchase a new peripheral device through a product purchase platform. As described in an embodiment with respect to FIG. 1, the peripheral device workspace management system database 167 may store a user composite peripheral device workspace identifier that is unique to individual users of one or more defined peripheral device workspaces (e.g., 101) that are associated with identification of the user of the user's information handling system 100 and peripheral device workspace identification values of the peripheral device workspaces (e.g., 250 or 260 in FIG. 2) used by that user. Thus, a user composite peripheral device workspace identifier may identify a single user of an anchor node information handling system 100, and a peripheral device workspace identification value for each of one or more peripheral device workspaces in which the user's information handling system 100 operates as an anchor node at various times. The user composite peripheral device workspace identifier may thus be user-specific and user-centric. The peripheral device workspace identification value, in comparison, may define a location and list of peripheral device nodes 142, and may thus be peripheral device workspace-centric.

As also described in an embodiment with respect to FIG. 3, such a user composite peripheral device workspace identifier may also be stored at each of the anchor nodes (e.g., 330) for any given peripheral device workspace (e.g., 350 and 360) identified within that user composite peripheral device workspace identifier. This user composite peripheral device workspace identifier for each user may include an identification of a single user, the plurality of peripheral device workspaces 350 and 360 associated with that user, the plurality of peripheral devices 351, 354, and 361 that have been operatively coupled to the user's information handling system 330 in a plurality of peripheral device workspaces 350 and 360, and various peripheral device operational and environmental context telemetry readings for each of the nodes 330, 351, 354, and 361 within each of the plurality of peripheral devices workspace 350 and 360 associated with that user. In an embodiment, the cloud manageability orchestration module 382 may execute code instructions to manage and store these user composite peripheral device workspace identifiers for each user in a peripheral device workspace management system database or other data base 387 or other database accessed by the cloud manageability orchestration module 382 executing at one or more peripheral device workspace cloud orchestrator servers. The cloud manageability orchestration module 382 may also execute code instructions to manage and store at the peripheral device workspace management system database 387 an association between the user, each peripheral device workspace (e.g., 350 or 360) in which the user's information handling system 330 has previously operated, previously received peripheral device operational and environmental context telemetry readings for that user and those peripheral device workspaces 350 and 360, and each peripheral device 351, 354, and 361 that has been operatively coupled to the information handling system 330 within those peripheral device workspaces 350 or 360.

The user may purchase a new peripheral device through a product purchase platform in an embodiment. For example, in an embodiment described with reference to FIG. 2, a new peripheral device 291 may be purchased by a user of the peripheral device workspace cloud orchestrator 280 from the product purchase platform 273, which is in communication with and accessible or manageable by the peripheral device workspace cloud orchestrator 280. As also described in an embodiment with respect to FIG. 3, code instructions for the peripheral device workspace cloud orchestrator 380 may be executed in an embodiment to automatically update peripheral device operational configuration policies for one or more peripheral devices (e.g., 391, 351, 354, or 361) within a peripheral device workspace (e.g., 350 or 360) as new peripheral devices (e.g., 391) are added to the user's various peripheral device workspaces 350 and 360. The code instructions for the cloud-based peripheral device workspace cloud orchestrator 380 in an embodiment may also be executed in communication with a cloud-based product purchase platform 373, which may include a manufacturer's or distributor's website for sale and purchase of new information handling systems or new peripherals (e.g., 391) for use in new or existing peripheral device workspaces 350 or 360 associated with a user. A user may wish to automatically configure a newly purchased peripheral device 391 in the same way that similar peripheral devices 351, or 354 (e.g., those being replaced by the new or updated peripheral devices) were configured, and for various peripheral device workspaces 350 or 360 already associated with that user.

A device manifest service in an embodiment at block 408 may receive notification from the product purchase platform of purchase by an identified user having a user composite peripheral device workspace identifier of a new peripheral device. For example, upon purchase of a new peripheral device 391 in an embodiment by a user associated with a known user composite peripheral device workspace identifier, the device manifest service 383 may receive notification from the product purchase platform (e.g., 273 of FIG. 2) of a purchase by an identified user of a new peripheral device 391.

At block 410, code instructions for a device manifest service may execute to instruct the ecosystem device management service to generate an orchestrated device descriptor (ODD) for the newly purchased peripheral device. Such an ODD in an embodiment may include a list of adjustable operational configurations and default operational configurations for configurable features of the newly purchased peripheral device. For example, code instructions of the device manifest service 383 in an embodiment may instruct the ecosystem manageability service module 384 to generate an orchestrated device descriptor (ODD) for the newly purchased peripheral device 391, including all user-adjustable functional capabilities for the newly purchase peripheral device 391. The ecosystem manageability service module 384 in an embodiment may execute code instructions to generate, maintain, and cross-reference ODDs and the functional capabilities for devices listed therewithin. Code instructions for the ecosystem manageability service module 384 in an embodiment may be executed to retrieve these user-adjustable functional capabilities from a device catalog 385, which may store all adjustable functional capabilities, as well as static or non-adjustable features for all peripheral devices or information handling systems made available for purchase via the product purchase platform (273 of FIG. 2). Default configurations for any adjustable operational configurations for the newly purchased peripheral device 391 may also be retrieved by the ecosystem manageability service module 384 from the device catalog 385.

Code instructions for the cloud manageability orchestrator module in an embodiment at block 412 may execute to retrieve non-configurable features of the newly purchased peripheral device from the device catalog service and adds non-configurable features to the ODD for the newly purchased peripheral device for storage under the user composite peripheral device workspace identifier in the peripheral device workspace management system database. This ODD may also be added along with the new peripheral device 391 to the manifest of peripheral devices for an intended peripheral device workspace (or plural workspaces) under its peripheral device workspace identification value. For example, the code instructions for the ecosystem manageability service module 384 may be executed to retrieve from the device catalog 385 static or non-adjustable features for the peripheral device 391, such as locations for various ports, physical dimensions of the new peripheral devices, or physical locations for internal components such as an embedded camera. Model number, device number, serial number, media access control (MAC) address, or other identifying information for the peripheral devices available for purchase may also be retrieved from the device catalog 385 in an embodiment. All of this information retrieved from the device catalog 385 may be stored as an ODD for the newly added peripheral device 391 at the peripheral device workspace management system database 387 of the peripheral device workspace cloud orchestrator 380 for each newly purchased peripheral device 391, and listed by device unique identifier. This ODD may also be associated with one or more peripheral device workspace identification values for any of one or more intended peripheral device workspace locations and may be associated with a user in a user composite peripheral device workspace identifier, or plural users, according to embodiments herein. The method of collecting peripheral device functional capabilities for existing and newly added peripheral devices within a defined peripheral device workspace for comparison to determine suitability of application of the same adjustable operational configurations to the newly added peripheral device may then end.

Figure 5:
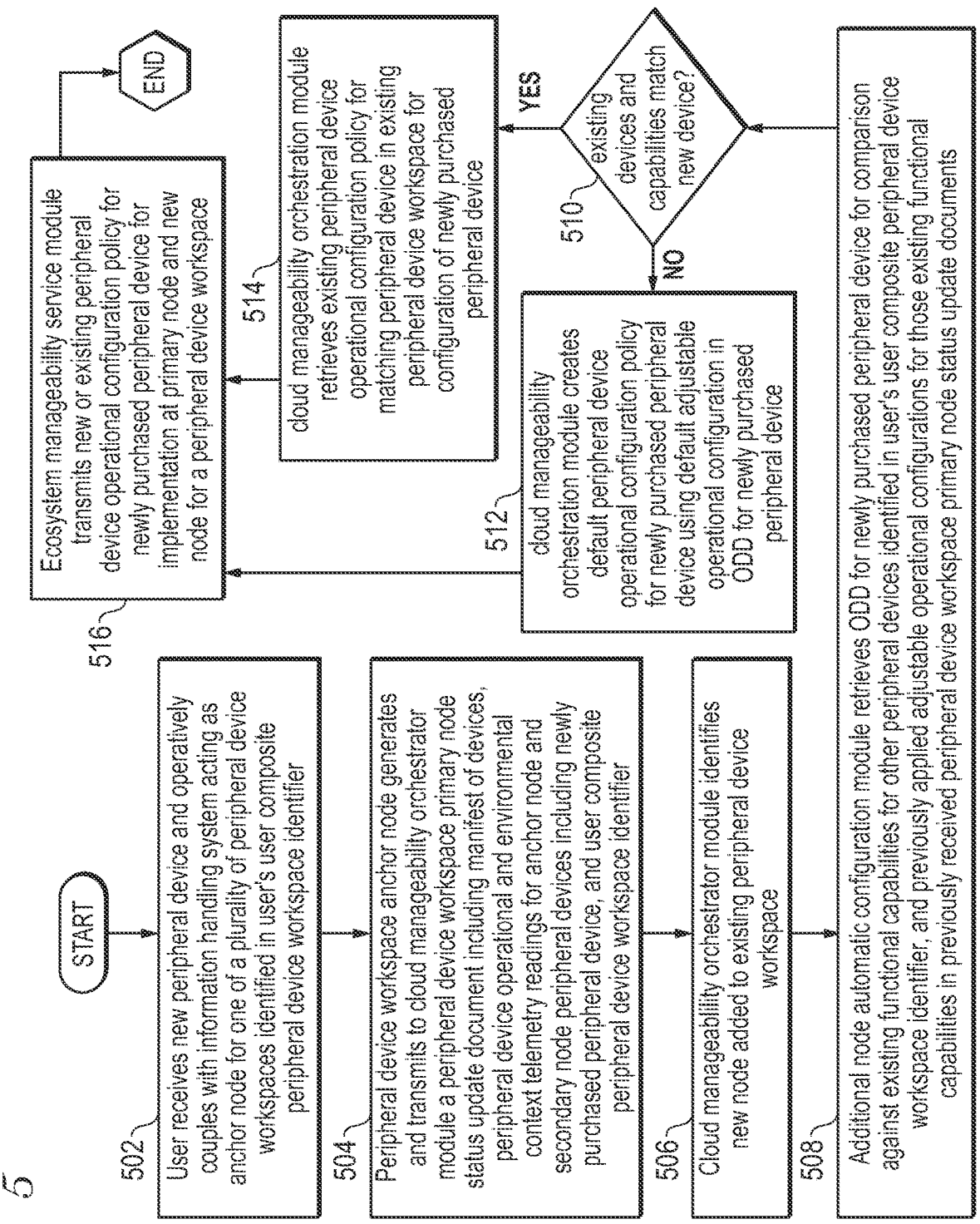
FIG. 5 is a flow diagram illustrating a method of automatically updating peripheral device configurations as new peripheral devices are added to the user's various peripheral device workspaces according to an embodiment of the present disclosure.

FIG. 5 is a flow diagram illustrating a method of automatically updating peripheral device configurations as the user peripheral device workspace and context change and as new peripheral devices are added to the user's various peripheral device workspaces, based on a comparison between the capabilities of such a new peripheral device and peripheral devices used in peripheral device workspaces previously associated with the user according to an embodiment of the present disclosure. As described herein, a user may wish to automatically configure newly purchased peripheral devices in the same way that similar peripheral devices (e.g., those being replaced by the new or updated peripheral device) were configured, and for various peripheral device workspaces and contexts already associated with that user.

At block 502, a user may receive a new peripheral device and operatively couples it with the user's information handling system acting as anchor node for one of a plurality of peripheral device workspaces identified within the user composite peripheral device workspace identifier for that user. For example, in an embodiment described with respect to FIG. 3, upon shipment of the newly purchased peripheral device 391 to the user and initial pairing of that device 391 with the user's information handling system 330 or the smart peripheral device 354, the anchor node 330 or the smart peripheral device 354 may notify the peripheral device workspace cloud orchestrator 380 at the peripheral device workspace cloud orchestrator server of this initial pairing or operative coupling.

The peripheral device workspace anchor node in an embodiment at block 504 may generate and transmit to the cloud manageability orchestrator module a peripheral device workspace anchor node status update document including a manifest of devices, peripheral device operational and environmental context telemetry readings for the anchor node and one or more secondary node peripheral devices, including newly purchased peripheral device, and a user composite peripheral device workspace identifier for the user. For example, the ecosystem manageability sub-agent executing code instructions at the information handling system 330 to which the newly purchased peripheral device 391 is operatively coupled in an embodiment may then discover all peripheral devices operatively coupled to the information handling system 330. For example, in an embodiment in which the new peripheral device 391 is operatively coupled to the information handling system 330 within the existing peripheral device workspace 350, the code instructions for the ecosystem manageability sub-agent on the information handling system 330 may execute to identify operative coupling with the smart peripheral device 354, the secondary node peripheral device 351 and the new peripheral device 391, such as described in greater detail above with respect to blocks 402 and 404 of FIG. 4.

Similar to the method described above with respect to blocks 402 and 404 of FIG. 4, code instructions for the ecosystem manageability sub-agent on the information handling system 330 may then execute to gather peripheral device operational and environmental context telemetry data, including current adjustable operational configurations for the information handling system 330, the smart peripheral device 354, the secondary node peripheral device 351 and the new peripheral device 391. In addition, the code instructions for the ecosystem manageability sub-agent on the information handling system 330 may execute to gather device functional capabilities for each of these peripheral devices 351, 354, and 391 via the firmware on each device, or via the ODD service (e.g., 392). The code instructions for the ecosystem manageability sub-agent on the information handling system 330 in such an embodiment may then execute to transmit this information, as well as the user composite peripheral device workspace identifier for the user in the form of a peripheral device workspace anchor node status update document to the ecosystem manageability service module 384 for updating ODD and associated environmental context data for device features capabilities, static configurations, user adjustable configurations for those capabilities. Transmission of the peripheral device workspace anchor node status update document to the ecosystem manageability service module 384 with updated ODD environmental context data also is updated in any relevant peripheral device workspace identification values and user composite peripheral device workspace identifiers having those peripheral devices associated with them at the peripheral device workspace cloud orchestrator 380.

At block 506, code instructions for the cloud manageability orchestrator module in an embodiment may execute to identify a new node added to an existing peripheral device workspace. For example, the cloud manageability orchestrator module 384 in an embodiment may receive the peripheral device workspace anchor node status update document generated at block 504, identifying the newly purchased peripheral device 391 by unique identifier (e.g., serial number), as well as the manifest of other nodes 330, 351, and 354, within the previously established peripheral device workspace 350. Code instructions for the cloud manageability orchestrator module may execute to access the user composite peripheral device workspace identifier also received in the peripheral device workspace anchor node status update document generated at block 504 and to identify all peripheral device workspaces (e.g., 350 and 360) having peripheral device workspace identification values included within the user composite peripheral device workspace identifier.

As described herein, for example in an embodiment described with reference to FIG. 1, a peripheral device workspace may be an ecosystem of node devices 142 connected to a primary or anchor node device such as the information handling system 100. In an embodiment, a peripheral device workspace may also be defined with a peripheral device workspace identification value and part of a user composite peripheral device workspace identifier associated with each of the information handling system 100 and peripheral devices (e.g., input/output devices 142). Code instructions for the cloud manageability orchestrator module may execute at block 506 to determine that the unique identifier (e.g., serial number) for the newly added peripheral device does not match any unique identifiers associated with the user composite peripheral device workspace identifier. This may indicate a need to configure the newly purchased peripheral device for use within the already established peripheral device workspace to which the user has added the newly purchased peripheral device at block 502. Code instructions for the cloud manageability orchestrator module in an embodiment may then execute to notify an additional node automatic configuration module that such a newly purchased peripheral device has been added to an existing peripheral device workspace, and may identify the newly purchased peripheral device using the unique identifier for that device as received within the peripheral device workspace anchor node status update document generated at block 504.

The code instructions for the additional node automatic configuration module in an embodiment at block 508 may execute at one or more peripheral device workspace cloud orchestrator servers to retrieve the ODD for the newly purchased peripheral device. The functional capabilities for the newly purchased peripheral device within this ODD in an embodiment may be used for comparison against existing functional capabilities for other peripheral devices identified in the user composite peripheral device workspace identifier. The newly purchased peripheral device ODD in an embodiment may also be used to compare previously applied adjustable operational configurations for those existing functional capabilities in previously received peripheral device workspace anchor node status update documents. These comparisons may indicate whether to configure the newly purchased peripheral device in the same way that other, previously used peripheral devices have also been configured.

At block 510, execution of code instructions for the additional node automatic configuration module in an embodiment may determine whether the new peripheral device matches existing devices having overlapping capabilities within user composite peripheral device workspace identifier meeting a threshold overlap percentage level or other threshold matching score according to embodiments herein. For example, in an embodiment, the additional node automatic configuration module 386 may access the peripheral device workspace anchor node status update document transmitted at block 504, indicating that the new peripheral device 391 has been operatively coupled to the information handling system 330 whose user is already associated with a user composite peripheral device workspace identifier. As described herein, the user may wish to configure a new peripheral device 391 in the same way as an existing peripheral device (e.g., 351 or 361) only if they are associated with the same peripheral device workspaces (e.g. 350) and have matching capabilities or associated with a sufficiently similar peripheral device workspace (e.g., 360) and have matching capabilities. In other embodiments, emphasis may be placed on matching capabilities of a newly added peripheral device 391 reaching a threshold overlap percentage level or other threshold matching score with a comparison to an existing peripheral device 351 or 361 that is used in any peripheral device workspace 350 or 360 by a user for determining recommended previously used adjustable operational configurations. In other words, code instructions for the additional node automatic configuration module 386 in an embodiment may be executed to recommend previously used adjustable operational configurations for existing peripheral devices to instruct operation of the new peripheral device 391 only if those previously used adjustable operational configurations were applied to another existing peripheral device 351 that has previously operated within the same peripheral device workspace (e.g., 350) in which the new peripheral device 391 is currently operating or with a peripheral device 361 in another peripheral device workspace 360 that is accessed by a user in various embodiments. In the latter situation, the code instructions for the additional node automatic configuration module 386 in one embodiment may be executed to require sufficient matching of the peripheral device workspace 360 of the existing peripheral device 361 with the intended peripheral device workspace 350 for the newly added peripheral device workspace. In other embodiments, this overlap of peripheral devices workspaces 350 and 360 may not be necessary, depending on the type of peripheral device or the recommended configuration settings being determined, and code instructions for the additional node automatic configuration module 386 in an embodiment may be executed to assess threshold overlap percentage level or other threshold matching score between an existing peripheral device 351 or 361 and a newly added peripheral device 391 according to embodiments described herein.

The additional node automatic configuration module 386 in an embodiment may execute code instructions to determine whether the device functional capabilities stored within the ODD for the new peripheral device match any existing functional capabilities for other peripheral devices, such as 351, 354, or 361 associated with the user of the information handling system 330 within its associated user composite peripheral device workspace identifier. This may occur, for example, if the user purchased the new peripheral device 391 to replace a broken or lost peripheral device of the same model or having matching functional capabilities or when a new peripheral device 391 is added to another peripheral device workspace when a similar peripheral device is used in a different peripheral device workspace.

As described herein in one or more embodiments with reference to FIG. 1 and other figures herein, an information technology decision maker (ITDM) for an enterprise, or the user of the information handling system 100 may define a minimum percentage of peripheral device features or operational capabilities between two comparable peripheral devices that must match in order to recommend that two comparable peripheral devices be configured in the same way. For example, a user or an ITDM may use the peripheral device workspace cloud orchestrator console 160 to require that 80 percent of features and functional capabilities, or ranges thereof, for two separate peripheral devices overlap one another at a threshold overlap percentage level or other threshold matching score level in order to recommend that both devices be configured according to the same peripheral device workspace operational configuration policy that defines one or more adjustable operational configurations for the two comparable devices. This is only an example of one threshold value, and other minimum requirements for identity of functional capabilities between two different peripheral devices in embodiments may include any value from one to one hundred (e.g., 50%, 75%, 90%, etc.).

In the case where the new peripheral device 391 meets a capability matching minimum percentage of 80%, for example, this may indicate that the user purchased an upgraded version of an existing peripheral device already associated with the user composite peripheral device workspace identifier. In such a case, the user may wish to initially set up the new peripheral device 391 with the same adjustable operational configuration as the existing peripheral device with matching functional capabilities that is already associated with the user composite peripheral device workspace identifier. If the functional capabilities of the new peripheral device 391 match functional capabilities for any existing peripheral device, such as 351 or 361, associated with the user composite peripheral device workspace identifier in an embodiment, the code instructions for the additional node automatic configuration module 386 may be executed to notify the cloud manageability orchestration module 382 of such a match.

The additional node automatic configuration module 386 in some embodiments may then execute code instructions to determine whether the list of peripheral devices 351 and 354 to which the information handling system 330 is currently operatively coupled matches the peripheral device list for any existing peripheral devices workspaces (e.g., 360) associated with the user composite peripheral device workspace identifier if a compared peripheral device 361 is compared to the newly added peripheral device 391 intended for a different peripheral device workspace 350. As described herein in an embodiment with reference to FIG. 1, an information technology decision maker (ITDM) for an enterprise, or the user of the information handling system 100 may define a minimum percentage of peripheral devices 142 (as identified by unique serial number) between two comparable peripheral device workspaces that must match in order to recommend that two comparable peripheral devices be configured in the same way. This latter aspect of comparing peripheral device workspaces may be applied in some embodiments, while in other embodiments depending on recommended configurations or types of peripheral devices, this peripheral device workspace comparison may not be needed or may be deemphasized by using a lower overlap percentage threshold among peripheral device workspaces. For example, a user or an ITDM may use the peripheral device workspace cloud orchestrator console 160 to require that 50 percent of peripheral devices for two separate peripheral device workspaces overlap one another in order to recommend that both peripheral devices meeting threshold overlap percentage level or other threshold matching score be configured according to the same peripheral device workspace operational configuration policy that defines one or more adjustable operational configurations for the two comparable peripheral devices. This is only an example of one threshold value, and other minimum requirements for identity of peripheral devices between two different peripheral device workspaces in embodiments may include any value from one to one hundred (e.g., 20%, 30%, 60%, etc.).

For example, in an embodiment in which the new peripheral device 391 is operatively coupled to the information handling system 330, which is also operatively coupled to peripheral devices 351 and 354, if 66% of the peripheral devices including 361 that are identified within the most recently generated manifest for peripheral device workspace 360 match the peripheral devices 351 and 354 previously associated with peripheral device workspace 350 then peripheral device workspaces 350 and 360 meet the peripheral device workspace matching threshold. If the workspace matching minimum percentage is set to say 50%, then the 66% match rate may exceed the peripheral device workspace matching minimum percentage. Code instructions for the additional node automatic configuration module 386 in an embodiment may then be executed to notify the cloud manageability orchestration module 382 of this peripheral device workspaces match. As described, this latter aspect for peripheral devices workspace matching may be required in only some embodiments or may be deemphasized with a low match percentage in some embodiments herein.

If either the peripheral device workspace or the functional capabilities do not match, as described directly above, this may indicate a low likelihood that the user wishes to configure the new peripheral device according to an existing manageability protocol for a previously used peripheral device, and the method may proceed to block 512 for configuration of the new peripheral device according to a default configuration. If the peripheral device workspace and the functional capabilities do match, this may indicate a strong likelihood that the user may wish to automatically configure the new device in a similar manner as the matching device, and the method may proceed to block 514 for such recommendation or execution of a common peripheral device configuration setting.

In an embodiment in which either the peripheral device workspace or the functional capabilities do not match, as described directly above, the cloud manageability orchestration module may execute code instructions to create a default peripheral device operational configuration policy for the newly purchased peripheral device using default adjustable operational configuration values stored in the ODD for the newly purchased peripheral device. For example, the cloud manageability orchestration module 382 in an embodiment may access the ODD for the new peripheral device 391 within the peripheral device workspace anchor node status update document generated at block 504 to identify one or more default peripheral device operational configurations. As described herein in an embodiment with respect to block 410 of FIG. 4, the ODD may include a list of adjustable operational configurations and default operational configurations for configurable features of the newly purchased peripheral device. The cloud manageability orchestration module at block 512 may execute code instructions to generate a default peripheral device operational configuration policy instructing the new peripheral device 391 to execute according to one or more default peripheral device adjustable operational configurations defined within the ODD for the newly purchased peripheral device 391. The method may then proceed to block 516 for implementation of this default peripheral device operational configuration policy at the newly purchased peripheral device 391.

At block 514, in an embodiment in which the peripheral device workspace and the functional capabilities between two peripheral devices including the newly purchased peripheral device match, as described above with respect to block 510, the cloud manageability orchestration module may execute code instructions to retrieve an existing peripheral device operational configuration policy for a matching peripheral device within an existing peripheral device workspace for configuration of the newly purchased peripheral device. As described herein, when the functional capabilities for the new peripheral device and an existing peripheral device are sufficiently similar (e.g., as determined at block 510 above) to meet a threshold overlap percentage level or other threshold matching score, this may indicate that the user may wish to initially set up the new peripheral device with the same adjustable operational configuration as the existing peripheral device with matching functional capabilities. In such an embodiment, code instructions for the cloud manageability orchestration module 382 may be executed to identify a peripheral device operational configuration policy stored within the peripheral device workspace management system database 387 including one or more adjustable operational configurations for the matching existing peripheral device that has previously operated within the same peripheral device workspace as an anchor node information handling system 330.

In an embodiment at block 516, code instructions for the ecosystem manageability service module may execute to transmit the existing peripheral device operational configuration policy chosen at block 514 or default peripheral device operational configuration policy generated at block 512 for the newly purchased peripheral device for implementation via the anchor node and the newly purchased peripheral device within the peripheral device workspace. For example, code instructions for the ecosystem manageability service module 384 in an embodiment may be executed to transmit the existing peripheral device operational configuration previously applied to the matching peripheral device 351 or 361 that previously operated within the same existing peripheral device workspace 350 or 360 with the anchor node information handling system 330 to the peripheral device workspace (e.g., 350) in which the new peripheral device 391 is currently operating with the anchor node information handling system 330 in the peripheral device workspace 350. In another example, code instructions for the ecosystem manageability service module 384 in an embodiment may be executed to transmit a default peripheral device operational configuration generated at block 512 to the anchor node information handling system 330 for implementation of the newly added peripheral device 391 in the peripheral device workspace 350.

Upon receipt of the new or existing peripheral device operational configuration policy at the ecosystem manageability sub-agent of the information handling system 330, the newly purchased peripheral device 391 may be configured according to that received peripheral device operational configuration policy, whether based on existing or default peripheral device operational configuration as described in embodiments above. As the user continues to use this newly purchased peripheral device 391 in various peripheral device workspaces (e.g., 350 or 360) and their environmental contexts, new peripheral device workspace anchor node status update documents may be generated that include configuration settings for the newly purchased peripheral device 391, as described above with respect to FIG. 2. The peripheral device workspace cloud orchestrator 380 may continue to gather such peripheral device workspace anchor node status update documents and adjust peripheral device operational configuration policies associated with this newly purchased peripheral device 391 according to changes in peripheral device workspace (e.g., 350 or 360) and reported environmental context telemetry data, as was performed with previously operatively coupled peripheral devices 351, 354 and 361. In such a way, the peripheral device workspace cloud orchestrator 380 may automatically update peripheral device configurations as the user peripheral device workspace 350 and 360 and context change and as new peripheral devices 391 are added to the user's various peripheral device workspaces 350 and 360. The method for automatically updating peripheral device configurations as new peripheral devices are added to the user's various peripheral device workspaces may then end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device workspace cloud orchestrator executing at a cloud-based information handling system comprising:

a network interface device to receive a plurality of existing functional capabilities for an existing peripheral device within a manifest of a first plurality of peripheral device nodes that have been previously operatively coupled to a user information handling system at an identified location to form a defined peripheral device workspace identified by a peripheral device workspace identification value in which the user information handling system acts as an anchor node;

the network interface device to receive a user composite peripheral device workspace identifier for a user of the anchor node associated with a stored adjustable operational configuration of the plurality of existing functional capabilities selected by the user for operation of the existing peripheral device in the peripheral device workspace and a storage memory to storing the same with an existing peripheral device orchestrated device descriptor (ODD);

a hardware processor to execute code instructions for the peripheral device workspace cloud orchestrator to identify a plurality of new peripheral device capabilities for a new peripheral device operatively coupled to the anchor node in the peripheral device workspace, wherein the plurality of new peripheral device capabilities for the new peripheral device and identification of the new peripheral device form a new peripheral device ODD stored in the storage memory;

the hardware processor to execute code instructions to determine a minimum peripheral device threshold overlap percentage of the plurality of new peripheral device capabilities from the new peripheral device ODD matching the plurality of existing function capabilities from the existing peripheral device ODD in the peripheral device workspace; and the hardware processor to execute code instructions to instruct the anchor node to configure the new peripheral device according to the stored adjustable operational configuration associated with the user composite peripheral device workspace identifier from the existing peripheral device ODD.

2. The peripheral device workspace cloud orchestrator of claim 1, wherein the new peripheral device is an external display device and the adjustable operational configuration controls one of display resolution, display refresh rate, brightness, contrast, color gamut, horizontal view angle, vertical view angle, or response time.

3. The peripheral device workspace cloud orchestrator of claim 1, wherein the new peripheral device is an external webcam and the adjustable operational configuration controls audio/visual connection type, video capture resolution, image depth, video capture refresh rate, or captured frames per second.

4. The peripheral device workspace cloud orchestrator of claim 1, wherein the new peripheral device is an external microphone and the adjustable operational configuration controls audio output type, audio output frequency, or application of one or more audio filters.

5. The peripheral device workspace cloud orchestrator of claim 1, wherein the new peripheral device is an external speaker and the adjustable operational configuration controls audio input type, audio input frequency, or application of one or more audio filters.

6. The peripheral device workspace cloud orchestrator of claim 1, wherein the adjustable operational configuration defines selection of a communication protocol for a wireless communication link operatively coupling the new peripheral device to the anchor node.

7. The peripheral device workspace cloud orchestrator of claim 1, wherein the existing functional capabilities for the existing peripheral device, a unique identification value, and peripheral device type classification of the existing peripheral device form the existing peripheral device ODD for the existing peripheral device.

8. A method for automatic configuration of a newly purchased peripheral device added to a defined and preexisting peripheral device workspace comprising:
receiving, via a network interface device, a plurality of existing functional capabilities for an existing peripheral device within a manifest of a first plurality of peripheral device nodes that have been previously operatively coupled to a user information handling system at an identified location to form a defined peripheral device workspace identified by a peripheral device workspace identification value in which the user information handling system acts as an anchor node;
receiving and storing, via the network interface device, a user composite peripheral device workspace identifier for a user of the anchor node associated with a stored adjustable operational configuration of the plurality of existing functional capabilities selected by the user for operation of the existing peripheral device in the peripheral device workspace in a storage memory as an existing device orchestrated device descriptor (ODD);
identifying, via a hardware processor executing code instructions, a plurality of new peripheral device capabilities for a new peripheral device operatively coupled to the anchor node in the peripheral device workspace, wherein the plurality of new peripheral device capabilities for the new peripheral device and identification of the new peripheral device form a new device ODD for the new peripheral device;
determining, via the hardware processor, a minimum peripheral device threshold overlap percentage of the plurality of new peripheral device capabilities matching the plurality of existing function capabilities for the existing peripheral device in the peripheral device workspace; and
instructing, via the hardware processor, the anchor node to configure the new peripheral device according to the stored adjustable operational configuration associated with the user composite peripheral device workspace identifier from the existing peripheral device ODD.

9. The method of claim 8, wherein the new peripheral device is an external display device and the adjustable operational configuration controls one of display resolution, display refresh rate, brightness, contrast, color gamut, horizontal view angle, vertical view angle, or response time.

10. The method of claim 8, wherein the new peripheral device is an external webcam and the adjustable operational configuration controls audio/visual connection type, video capture resolution, image depth, video capture refresh rate, or captured frames per second.

11. The method of claim 8, wherein the new peripheral device is an external microphone and the adjustable operational configuration controls audio output type, audio output frequency, or application of one or more audio filters.

12. The method of claim 8 further comprising:
determining, via the hardware processor, a peripheral device workspace threshold overlap percentage between a second peripheral device workspace having the existing peripheral device and the peripheral device workspace housing the new peripheral device to further determine a match between the plurality of new peripheral device capabilities with the plurality of existing function capabilities for the existing peripheral device between the peripheral device workspace and the second peripheral device workspace.

13. The method of claim 8, wherein the adjustable operational configuration defines selection of a communication protocol for a wireless communication link operatively coupling the new peripheral device to the anchor node.

14. The method of claim 8, wherein the existing functional capabilities for the existing peripheral device, a unique peripheral device identification value of the existing peripheral device, and a peripheral device type classification form the existing peripheral device ODD for the existing peripheral device.

15. A peripheral device workspace cloud orchestrator executing at a cloud-based information handling system comprising:
a network interface device to receive a plurality of existing functional capabilities for an existing peripheral device within a first manifest of a first plurality of peripheral device nodes that have been previously operatively coupled to a user information handling system at an identified location to form a defined first peripheral device workspace identified by a first peripheral device workspace identification value in which the user information handling system acts as an anchor node, wherein the existing functional capabilities for the existing peripheral device and identification of the existing peripheral device form an existing peripheral device orchestrated device descriptor (ODD) for the existing peripheral device;
a storage memory to receive and store a user composite peripheral device workspace identifier for a user of the anchor node associated with a stored adjustable operational configuration of the plurality of existing functional capabilities selected by the user for operation of the existing peripheral device in the first peripheral device workspace and associated with the existing peripheral device ODD;

a hardware processor to execute code instructions for the peripheral device workspace cloud orchestrator to identify a plurality of new peripheral device capabilities for a new peripheral device operatively coupled to the anchor node in a second peripheral device workspace that includes the new peripheral device, wherein the plurality of new peripheral device capabilities for the new peripheral device and identification of the new peripheral device form a new device ODD for the new peripheral device;

the hardware processor to execute code instructions to determine a minimum peripheral device threshold overlap percentage of the plurality of new peripheral device capabilities matching the plurality of existing function capabilities for the existing peripheral device in the peripheral device workspace; and the hardware processor to execute code instructions to instruct the anchor node to configure the new peripheral device according to the stored adjustable operational configuration associated with the user composite peripheral device workspace identifier from the existing peripheral device ODD.

16. The peripheral device workspace cloud orchestrator of claim 15, further comprising:

the hardware processor determining a peripheral device workspace threshold overlap percentage between the first peripheral device workspace having the existing peripheral device and the second peripheral device workspace housing the new peripheral device to further determine a match between the plurality of new peripheral device capabilities with the plurality of existing function capabilities for the existing peripheral device between the first peripheral device workspace and the second peripheral device workspace.

17. The peripheral device workspace cloud orchestrator of claim 15, wherein the new peripheral device is an external display device and the adjustable operational configuration controls one of display resolution, display refresh rate, brightness, contrast, color gamut, horizontal view angle, vertical view angle, or response time.

18. The peripheral device workspace cloud orchestrator of claim 15, wherein the new peripheral device is an external webcam and the adjustable operational configuration controls audio/visual connection type, video capture resolution, image depth, video capture refresh rate, or captured frames per second.

19. The peripheral device workspace cloud orchestrator of claim 15, wherein the new peripheral device is an external speaker and the adjustable operational configuration controls audio input type, audio input frequency, or application of one or more audio filters.

20. The peripheral device workspace cloud orchestrator of claim 15, wherein the existing functional capabilities for the existing peripheral device, a unique peripheral device identification value of the existing peripheral device, and a peripheral device type classification form the existing peripheral device ODD for the existing peripheral device.

* * * * *